US012358293B2

(12) United States Patent
Xia et al.

(10) Patent No.: US 12,358,293 B2
(45) Date of Patent: Jul. 15, 2025

(54) INK CARTRIDGE AND PRINTING APPARATUS

(71) Applicant: ZHUHAI NINESTAR MANAGEMENT CO., LTD., Guangdong (CN)

(72) Inventors: Jingzhang Xia, Zhuhai (CN); Shichao Liang, Zhuhai (CN); Zhengtao Li, Zhuhai (CN)

(73) Assignee: ZHUHAI NINESTAR MANAGEMENT CO., LTD., Zhuhai (CN)

( * ) Notice: Subject to any disclaimer, the term of this patent is extended or adjusted under 35 U.S.C. 154(b) by 173 days.

(21) Appl. No.: 18/354,145

(22) Filed: Jul. 18, 2023

(65) Prior Publication Data

US 2023/0356532 A1 Nov. 9, 2023

Related U.S. Application Data

(63) Continuation of application No. PCT/CN2022/074399, filed on Jan. 27, 2022.

(30) Foreign Application Priority Data

Jan. 27, 2021 (CN) .......................... 202110111127.0
Mar. 11, 2021 (CN) .......................... 202120527499.7

(51) Int. Cl.
*B41J 2/175* (2006.01)

(52) U.S. Cl.
CPC ......... *B41J 2/17526* (2013.01); *B41J 2/1752* (2013.01); *B41J 2/1755* (2013.01)

(58) Field of Classification Search
CPC .... B41J 2/175; B41J 2/17506; B41J 2/17509; B41J 2/17513; B41J 2/1752;
(Continued)

(56) References Cited

U.S. PATENT DOCUMENTS 6,431,697 B1 * 8/2002 King ...................... B41J 2/1752 347/86
7,101,021 B2 * 9/2006 Aruga .................... H05K 1/117 347/49
(Continued)

FOREIGN PATENT DOCUMENTS

CN 206664001 U 11/2017
CN 109600997 A 4/2019
(Continued)

OTHER PUBLICATIONS

Decision to Grant a Patent issued on Apr. 2, 2024, in corresponding Japanese Application No. 2023-543226, 5 pages.
(Continued)

*Primary Examiner* — Anh T Vo
(74) *Attorney, Agent, or Firm* — Maier & Maier, PLLC

(57) ABSTRACT

An ink cartridge and a printing apparatus using the same. The ink cartridge includes an ink cartridge body, a chip and a chip holder, and the chip is fixed on the chip holder; when the ink cartridge is installed on the printer along an installation direction, the printer may drive the chip holder to linearly move along a top surface of the ink cartridge body, the chip holder is located at a first position before linearly moving and located at a second position after linearly moving; the chip at the first position is closer to the top surface of the ink cartridge body than at the second position, and when the chip holder is at the second position, the chip abuts against the stylus. The ink cartridge and printing apparatus achieve a higher stability of the electrical connection of the chip and the stylus in a printer.

19 Claims, 19 Drawing Sheets

(58) Field of Classification Search
CPC .. B41J 2/17526; B41J 2/17546; B41J 2/1755; B41J 2/17553
See application file for complete search history.

(56) References Cited

U.S. PATENT DOCUMENTS

| | | | | |
|---|---|---|---|---|
| 8,534,801 | B2 * | 9/2013 | Yoshino | B41J 2/17526 347/86 |
| 9,248,656 | B2 * | 2/2016 | Nozawa | B41J 2/17553 |
| 2007/0263044 | A1 | 11/2007 | Nip | |
| 2010/0091070 | A1 | 4/2010 | Kimura | |
| 2010/0225704 | A1 * | 9/2010 | Aoki | B41J 2/1752 347/50 |
| 2011/0205284 | A1 * | 8/2011 | Yoshino | B41J 2/17509 347/85 |
| 2013/0278683 | A1 | 10/2013 | Kanbe et al. | |
| 2014/0168324 | A1 | 6/2014 | Sasaki | |
| 2015/0165780 | A1 * | 6/2015 | Shiota | B41J 2/1714 347/86 |

FOREIGN PATENT DOCUMENTS

| | | | |
|---|---|---|---|
| CN | 210109557 | U | 2/2020 |
| CN | 210591041 | U | 5/2020 |
| CN | 112848689 | A | 5/2021 |
| CN | 214646882 | U | 11/2021 |
| CN | 214727480 | U | 11/2021 |
| JP | 2007015369 | A | 1/2007 |
| JP | 2011167966 | A | 9/2011 |
| JP | 4843112 | B1 | 12/2011 |
| JP | 2013220649 | A | 10/2013 |
| JP | 201852004 | A | 4/2018 |
| JP | 2018108686 | A | 7/2018 |
| JP | 2019171735 | A | 10/2019 |
| JP | 202032653 | A | 3/2020 |

OTHER PUBLICATIONS

International Search Report and Written Opinion issued on Apr. 8, 2022, in corresponding International Patent Application No. PCT/CN2022/074399, 16 pages.

Chinese Notice of Registration issued on Sep. 27, 2021, in corresponding Chinese Patent Application No. 202120227236.4, 4 pages.

Chinese Notice of Registration issued on Oct. 9, 2021, in corresponding Chinese Patent Application No. 202120527499.7, 4 pages.

Office Action issued on Nov. 11, 2024, in corresponding Chinese Application No. 202110111127.0, 16 pages.

Extended Search Report issued on Oct. 29, 2024, in corresponding European Application No. 22745317.2, 8 pages.

Office Action issued on May 9, 2025, in corresponding Chinese Application No. 202110111127.0, 15 pages.

* cited by examiner

INK CARTRIDGE AND PRINTING APPARATUS

CROSS-REFERENCE TO RELATED APPLICATIONS

This application is a continuation of International Application No. PCT/CN2022/074399, filed on Jan. 27, 2022, which claims priority to Chinese Patent Application No. 202110111127.0, entitled with "INK CARTRIDGE AND PRINTING APPARATUS", filed with China National Intellectual Property Administration on Jan. 27, 2021, and to Chinese Patent Application No. 202120527499.7, entitled with "INK CARTRIDGE", filed with China National Intellectual Property Administration on Mar. 11, 2021. The disclosures of the aforementioned applications are hereby incorporated by reference in their entireties.

TECHNICAL FIELD

The present application relates to the technical field of printing apparatus, and in particular, to an ink cartridge and a printing apparatus.

BACKGROUND

Printing apparatus is common office equipment. Existing printing apparatus mainly adopts an inkjet printing mode, and includes an ink cartridge containing ink, which is installed on a printer and sprays ink onto paper to form desired characters or patterns.

In the existing ink cartridge disclosed in the patent document U.S. Ser. No. 10/507,665B2, the ink cartridge is provided with a chip, the printer is provided with a stylus, and when the ink cartridge is installed on the printer, the chip is electrically connected with the stylus to realize the communication between the ink cartridge and the printer. Where, the ink cartridge is provided with a chip holder on which the chip is fixedly disposed, the chip holder is connected with the ink cartridge through an elastic member, the elastic force of the elastic member faces towards one side of the stylus, and the chip is pressed against the stylus through the elastic force of the elastic member so as to realize the electrical connection between the chip and the stylus.

However, the elastic member is easy to expand and contract, so that the chip holder is wobbled and the electrical connection between the chip and the stylus is unstable.

SUMMARY

The present application aims to provide an ink cartridge and a printing apparatus, where the stability of the electrical connection between a chip and a stylus in a printer is higher.

In a first aspect, the present application discloses an ink cartridge applied to a printer, where the printer is provided with a stylus, and the ink cartridge includes an ink cartridge body, a chip and a chip holder, where the chip is fixed on the chip holder; when the ink cartridge is installed on the printer along an installation direction, the printer drives the chip holder to move linearly along a top surface of the ink cartridge body, the chip holder is located at a first position before linearly moving and is located at a second position after linearly moving; the chip at the first position is closer to the top surface of the ink cartridge body than the chip at the second position, and when the chip holder is at the second position, the chip abuts against the stylus.

In some optional embodiments, one of the chip holder and the ink cartridge body is provided with a sliding part, the other one of the chip holder and the ink cartridge body is provided with a guiding part, the guiding part extends along a moving direction of the chip holder, the sliding part is inserted into the guiding part and may move relative to the guiding part, and the chip holder may also rotate relative to the ink cartridge body around an extending direction of the sliding part.

In some optional embodiments, the ink cartridge body is provided with a driving part protruding out of the ink cartridge body, the driving part protrudes toward the stylus and is located on one side of the chip holder away from the stylus; and the driving part is disposed on a moving track of the chip holder, and the chip holder may be in contact with the driving part so as to rotate around the sliding part while moving relative to the driving part along a wall surface of the driving part and change the spacing between the chip and the ink cartridge body.

In some optional embodiments, the chip holder is provided with an accommodating groove for accommodating the driving part, and a contour of the accommodating groove is matched with a contour of the driving part; or, an extending length of the accommodating groove along a moving direction of the chip holder is greater than that of the driving part along the moving direction of the chip holder.

In some optional embodiments, an extending length of the guiding part is identical with a moving stroke of the chip holder, so as to make the sliding part abut against an end portion of the guiding part when the chip is electrically connected to the stylus.

In some optional embodiments, the sliding part is disposed on the chip holder, and the guiding part is disposed on the ink cartridge body.

In some optional embodiments, the guiding part is a guiding chute disposed on the ink cartridge body, and the sliding part is a cylindrical structure disposed on the chip holder; and the sliding part is inserted into the guiding chute and may move relative to the guiding chute.

In some optional embodiments, the ink cartridge body is provided with a stopping part, and when the chip holder is located at the second position, the chip holder abuts against the stopping part so as to prevent the chip holder from moving from the second position to the first position.

In some optional embodiments, the stopping part protrudes from an outer surface of the ink cartridge body, and an outer wall surface of the chip holder may abut against the stopping part.

In some optional embodiments, one side of the chip holder facing the ink cartridge body is provided with a protruding clamping part, and when the chip holder is located at the second position, the clamping part abuts against the stopping part; and when the chip holder is switched between the first position and the second position, the clamping part may move along a wall surface of the stopping part on both sides of the stopping part.

In some optional embodiments, an elastic restoring member is disposed between the chip holder and the ink cartridge body, and a direction of an elastic force of the elastic restoring member is parallel to and opposite to a moving direction of the chip holder; and when the ink cartridge is separated from the printer, the chip holder may move along an extending direction of the guiding part under an action of the elastic force of the elastic restoring part so as to reduce a spacing between the chip and the ink cartridge body.

In some optional embodiments, a position of the chip holder abutting against the printer is located at an end portion of the chip holder along its moving direction; and/or, a position of the chip holder abutting against the printer is located on both sides of the chip holder along its moving direction.

In some optional embodiments, an extending direction of the guiding part is parallel to an installation direction of the ink cartridge; when the ink cartridge is installed on the printer, the chip holder may move relative to the ink cartridge body in a direction opposite to the installation direction of the ink cartridge.

In some optional embodiments, the ink cartridge body is further provided with a light shielding part, and the light shielding part is configured for shielding a detection light of the printer when the ink cartridge is installed on the printer, so as to prompt that the ink cartridge is installed in place.

In some optional embodiments, the ink cartridge body has an ink outlet; in an installation direction of the ink cartridge, the chip and the chip holder are further away from the ink outlet relative to the light shielding part; and at the first position, the highest point of the chip is lower than the light shielding part in a direction of gravity; at the second position, the highest point of the chip is higher than the light shielding part in the direction of gravity.

In some optional embodiments, the ink cartridge body is provided with a protective receiving groove, and the light shielding part may be received in the protective receiving groove; and the light shielding part is fixedly connected with the chip holder, and when the chip holder extends out and the chip is electrically connected with the stylus, the light shielding part extends out of the protective receiving groove to shield the detection light.

In a second aspect, the present application discloses a printing apparatus, including a printer and the ink cartridge described in the above first aspect, where the ink cartridge is at least one, and the printer is provided with a stylus corresponding to the ink cartridge; the printer is further provided with an installation part corresponding to the ink cartridge, and the ink cartridge is fixed on the printer through the installation part; the installation part is internally provided with a protruding top-butting part, and when the ink cartridge is installed on the printer, the top-butting part abuts against the chip holder.

With reference to the above technical solutions, when the ink cartridge provided by the present application is installed on a printer, the printer may drive the chip holder on the ink cartridge to move linearly along the top surface of the ink cartridge body, so that the spacing between a chip on the chip holder and the ink cartridge is increased, and the distance between the chip and a stylus is reduced until the chip is electrically connected with the stylus. At this time, the ink cartridge is fixedly connected with the printer. Meanwhile, the chip holder abuts against the stylus through the printer, and the chip may maintain the electrical connection state with the stylus as long as the ink cartridge and the printer do not move relative to each other, that is, the connection between the chip and the stylus is more stable.

DETAILED DESCRIPTION OF EMBODIMENTS

As described in the background art, in the prior art, a chip is connected to an ink cartridge through an elastic member. However, the elastic force due to the elastic member is easily affected by an external force, for example, the shaking of a printer, length of service life of the elastic member and the like, to expand and contract so that the situation that the chip cannot be stably abutted against the stylus is easy to occur.

In view of this, embodiments of the present application provide an ink cartridge and a printing apparatus, where a printer may drive a chip holder to move linearly along a top surface of an ink cartridge body when the ink cartridge is installed on the printer, so that the distance between the chip located on the chip holder and a stylus is reduced until the chip is electrically connected with the stylus. At this time, the ink cartridge is fixedly installed on the printer, the chip holder abuts against the stylus through the installation part of the printer, and the connection between the chip and the stylus is more stable.

Figure 1:
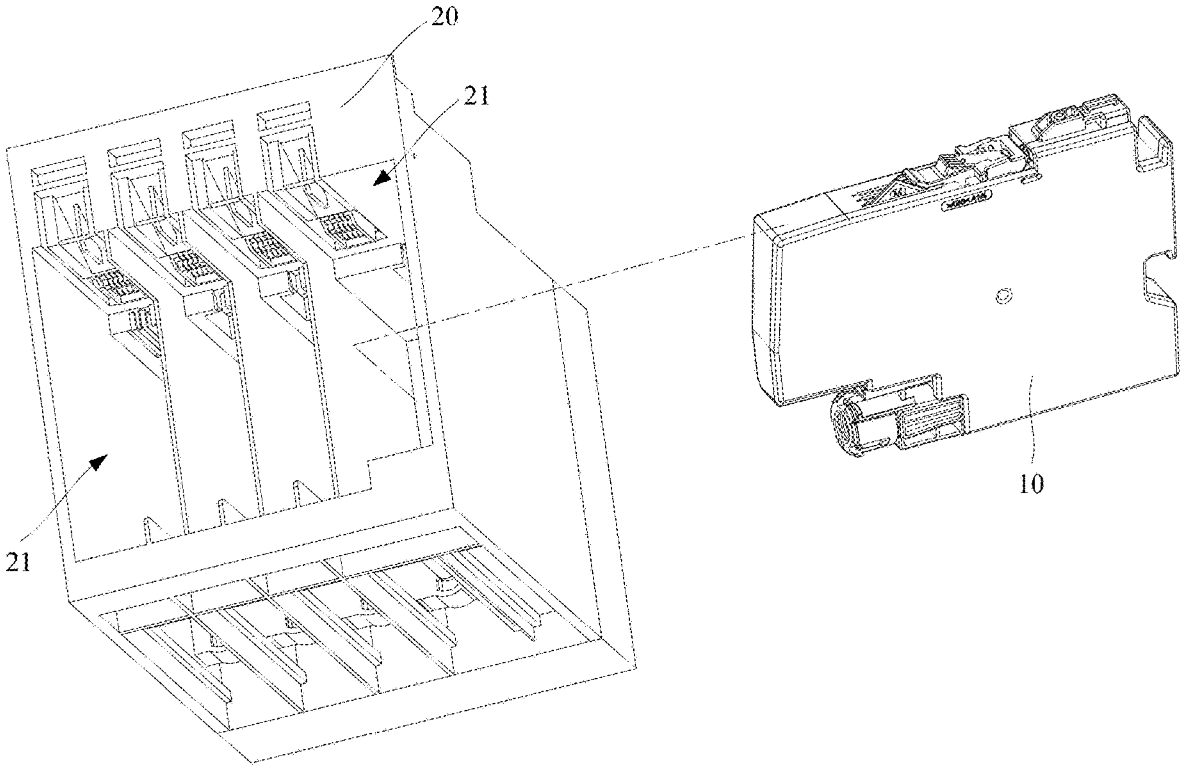
FIG. 1 is a structural schematic diagram of a printing apparatus provided in an embodiment of the present application.
Figure 2:
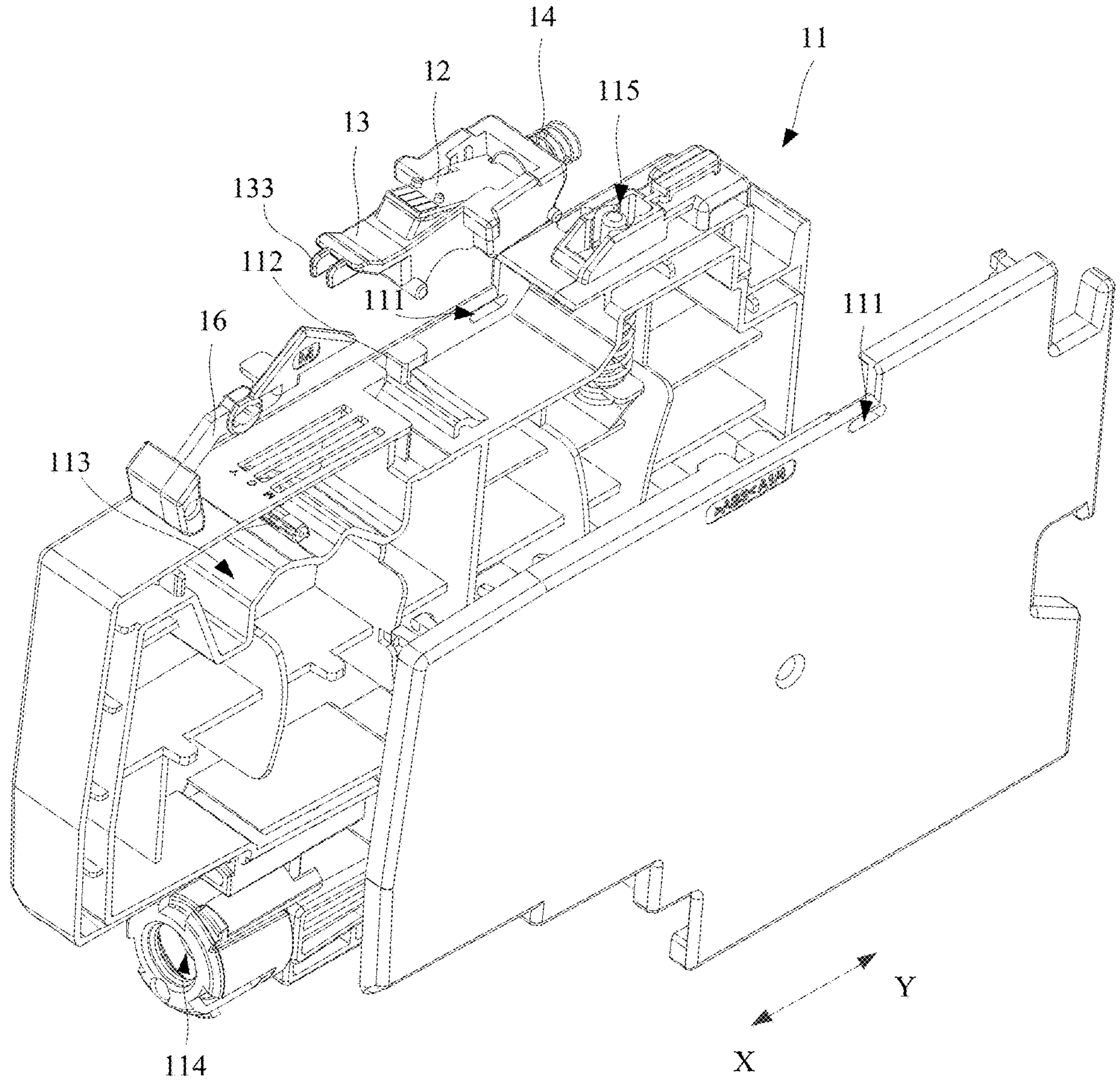
FIG. 2 is an exploded structural schematic diagram of an ink cartridge in FIG. 1.
Figure 3:
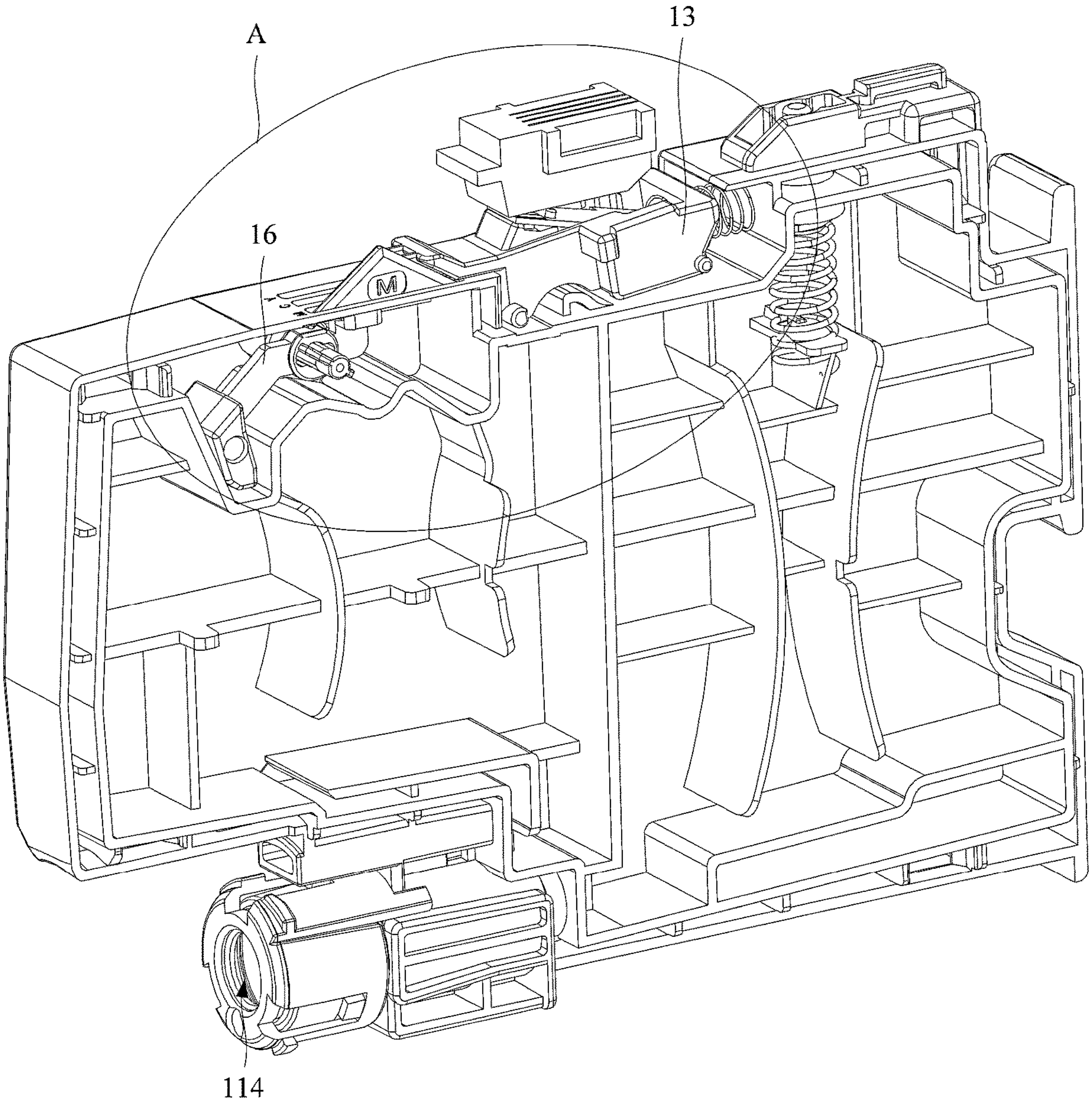
FIG. 3 is a structural schematic diagram of the ink cartridge in FIG. 1 when a stylus is separated from a chip.
Figure 4:
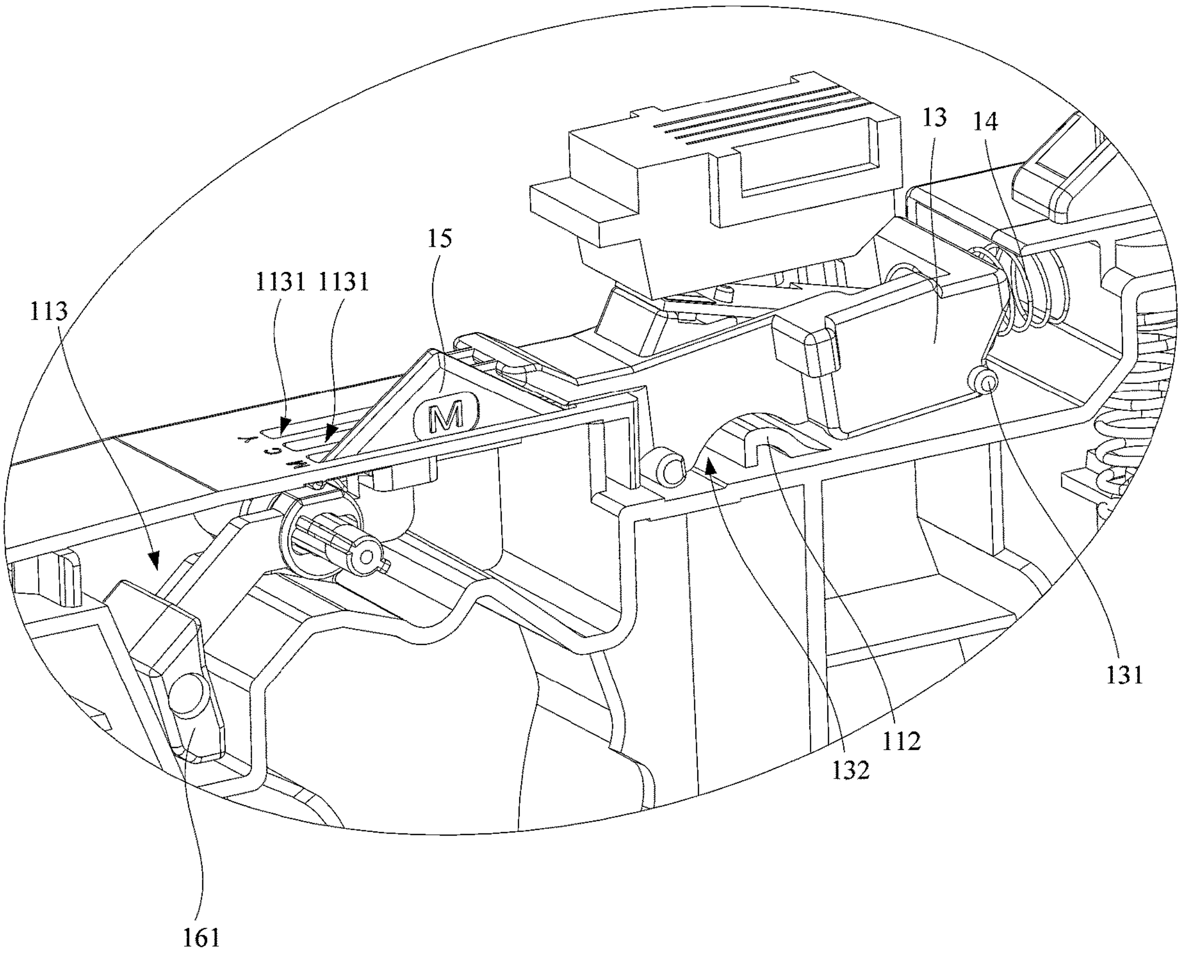
FIG. 4 is a structural schematic diagram of portion A in FIG. 3.
Figure 5:
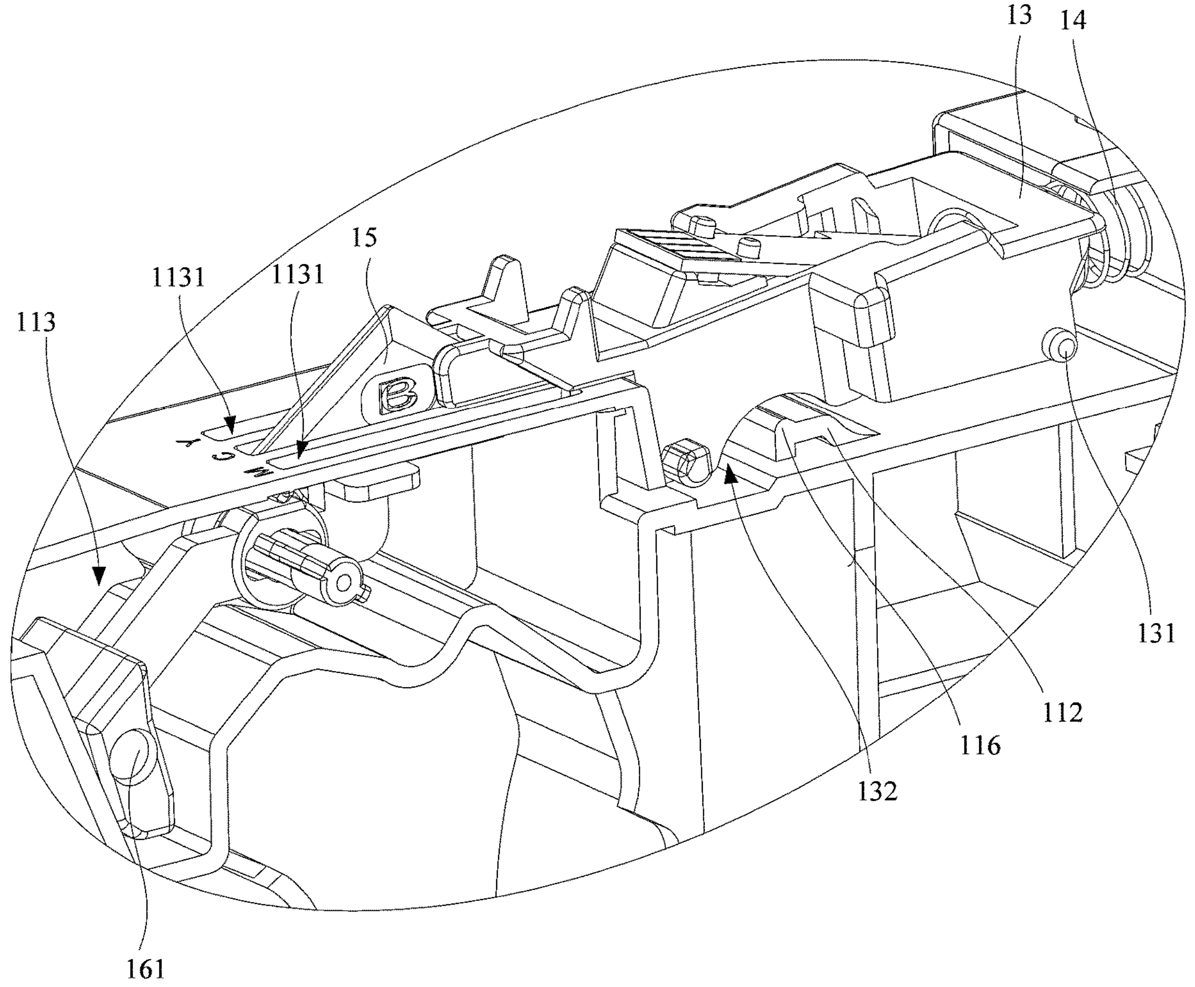
FIG. 5 is a structural schematic diagram of portion Ain FIG. 3 when a stopping part is provided.
Figure 6:
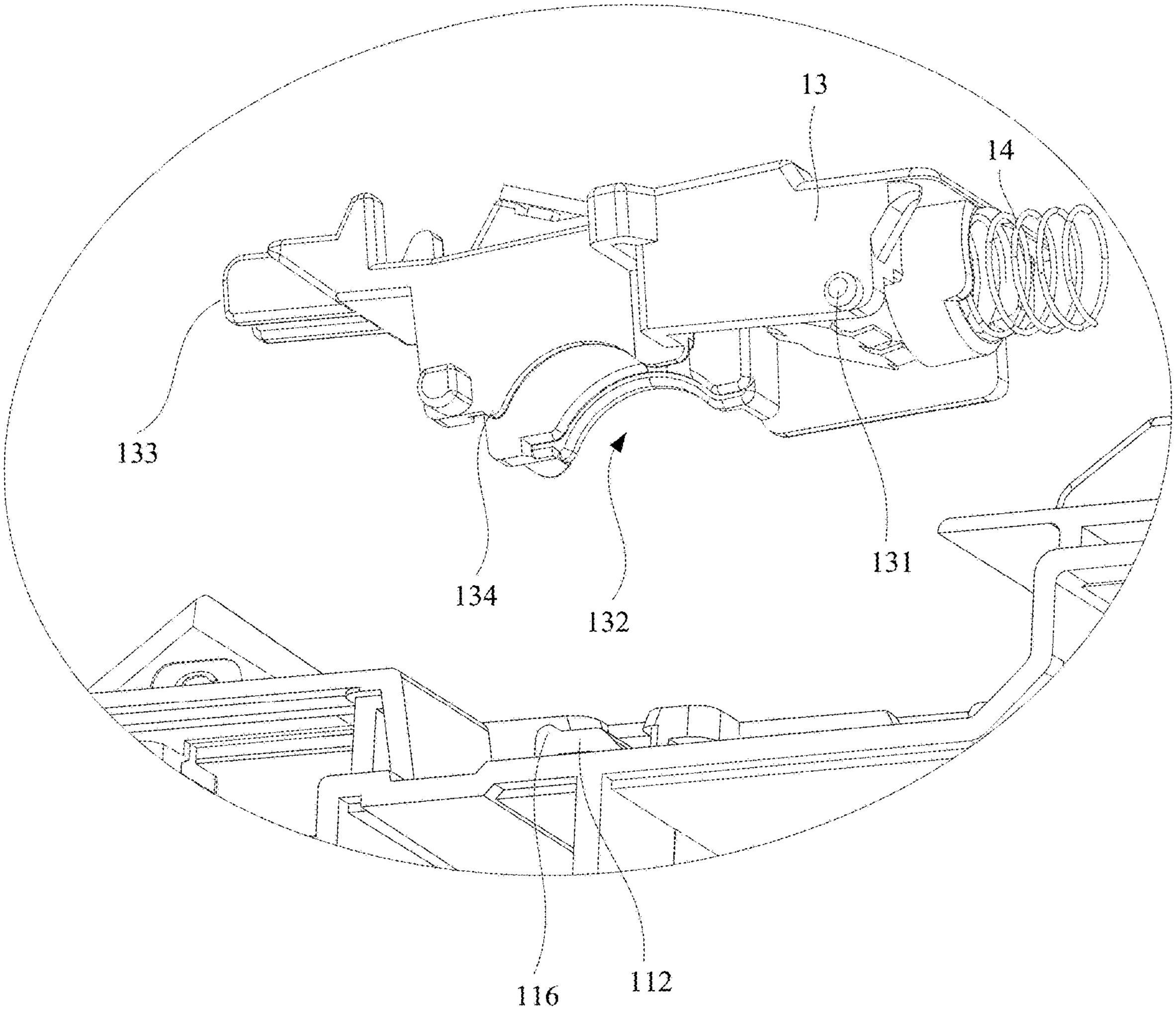
FIG. 6 is a partial exploded structural schematic diagram of portion A in FIG. 5.
Figure 7:
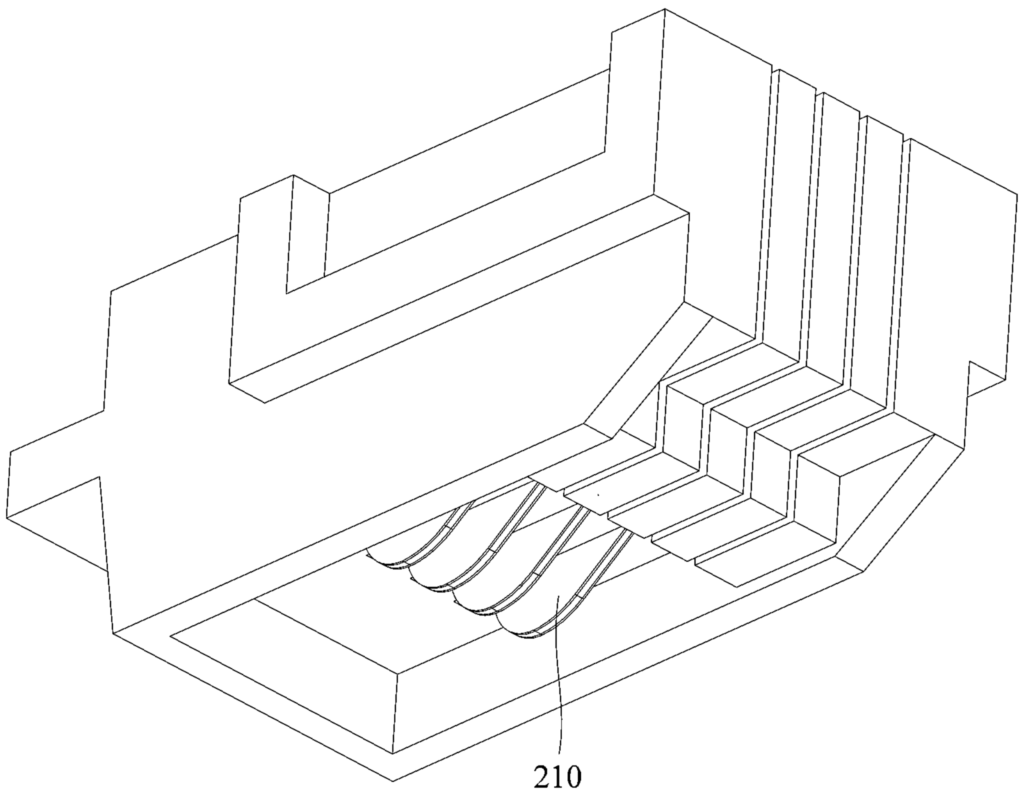
FIG. 7 is a structural schematic diagram of the stylus in FIG. 3.
Figure 8:
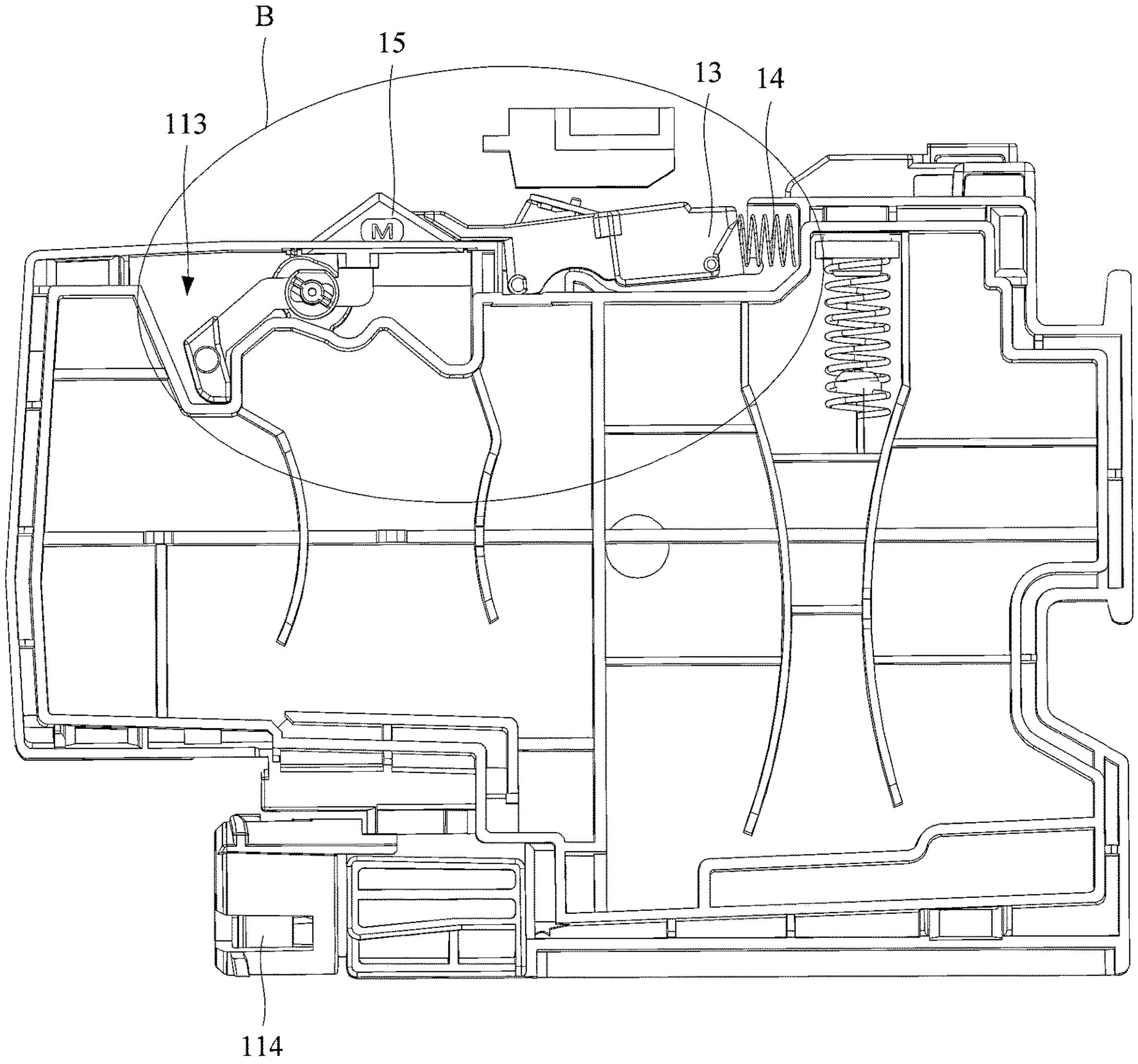
FIG. 8 is a side view of the ink cartridge in FIG. 3.
Figure 9:
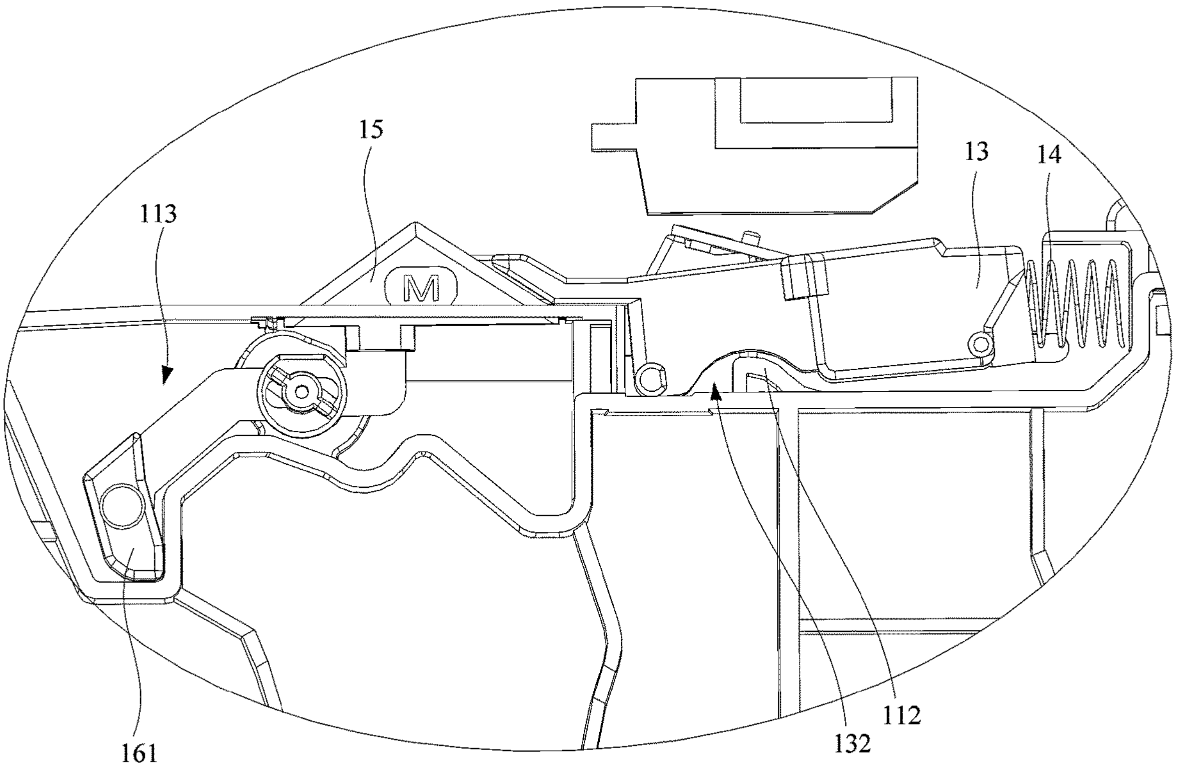
FIG. 9 is a structural schematic diagram of portion B in FIG. 8.
Figure 10:
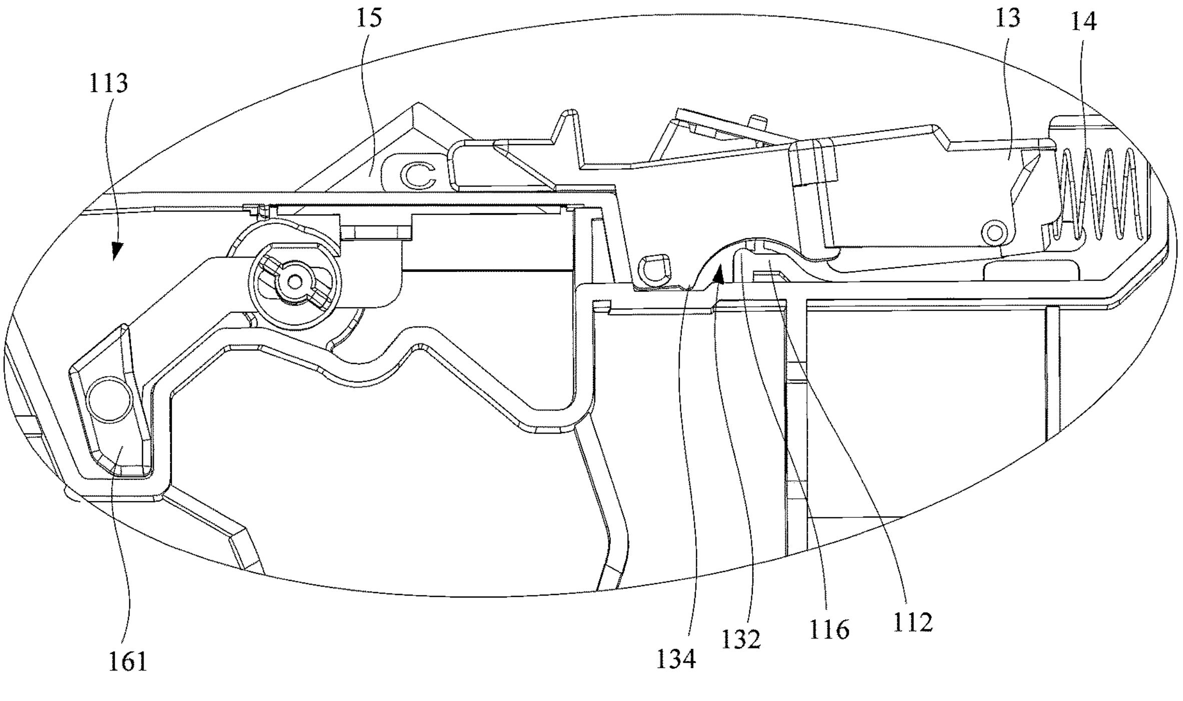
FIG. 10 is a structural schematic diagram of portion B in FIG. 8 when the stopping part is provided.
Figure 11:
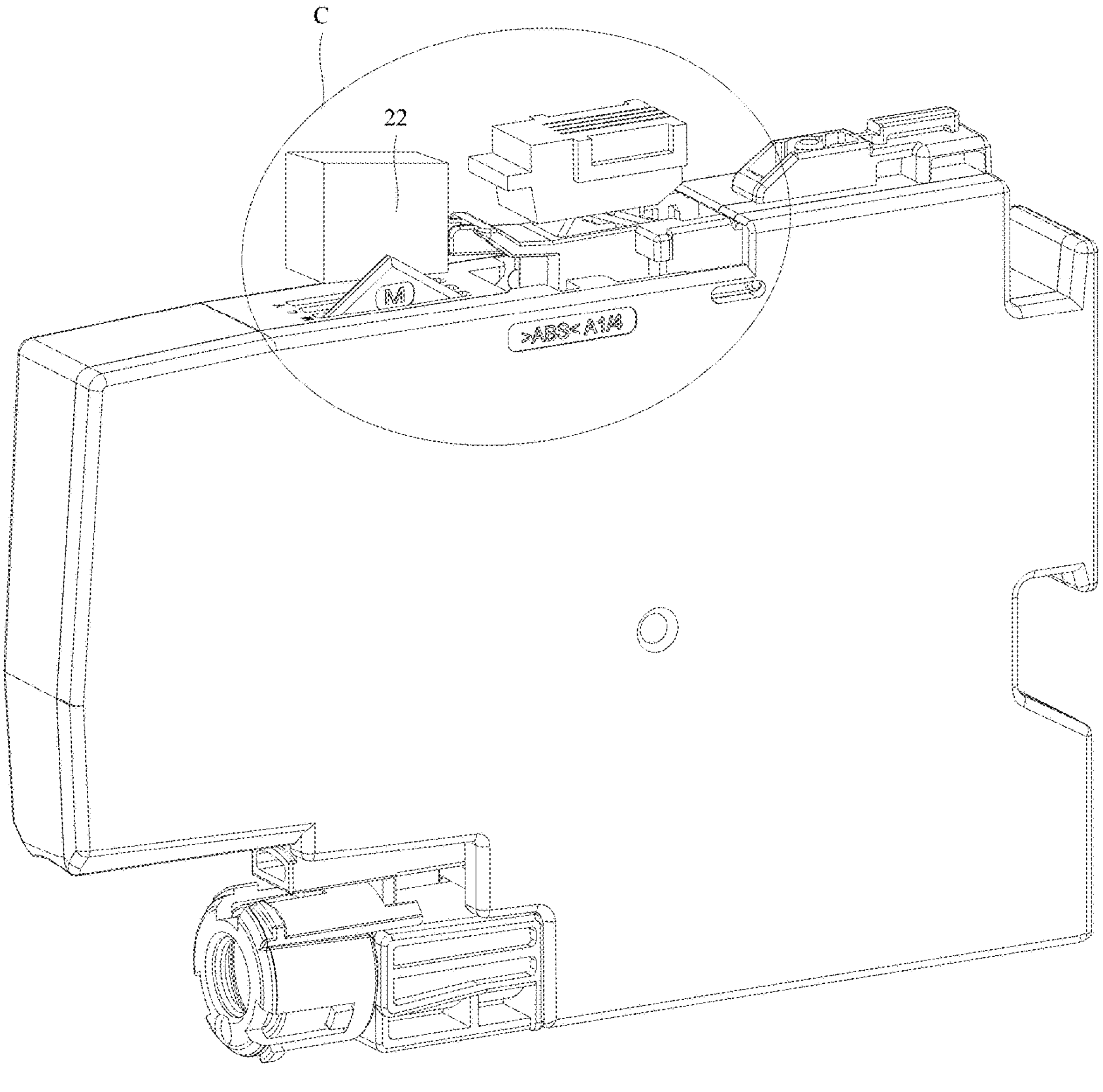
FIG. 11 is a structural schematic diagram of the ink cartridge in FIG. 1 when the stylus is electrically connected to the chip.
Figure 12:
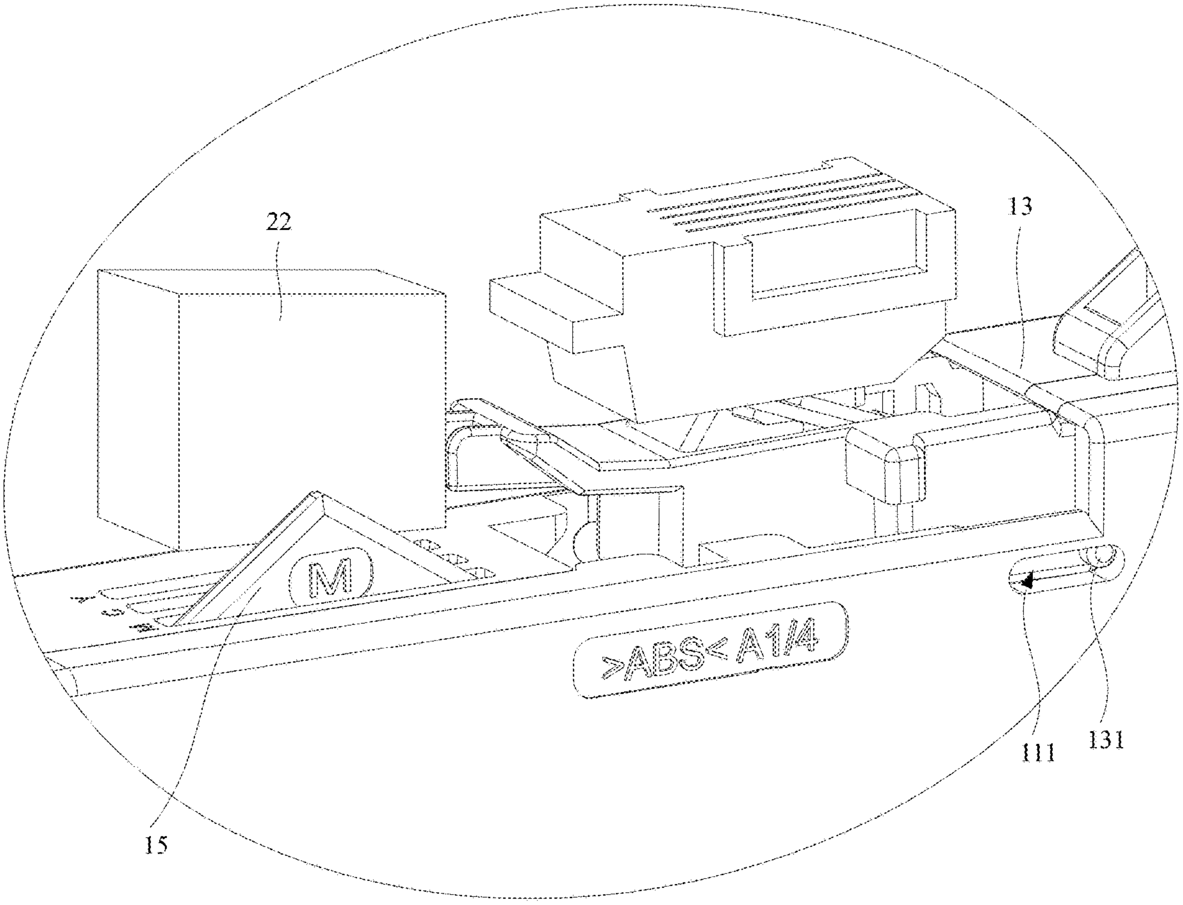
FIG. 12 is a structural schematic diagram of portion C in FIG. 11.
Figure 13:
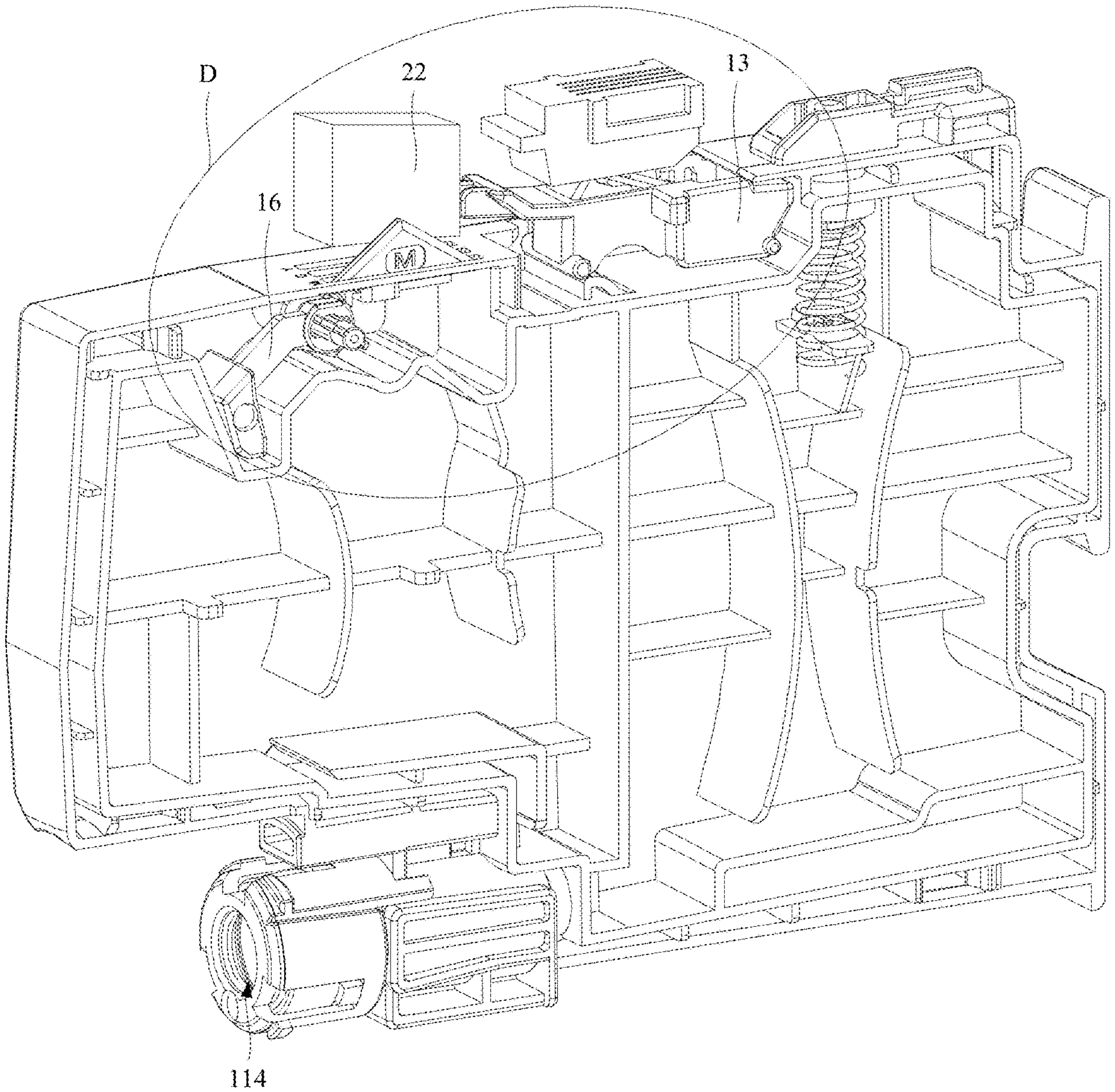
FIG. 13 is a partial structural schematic diagram of the ink cartridge in FIG. 11.
Figure 14:
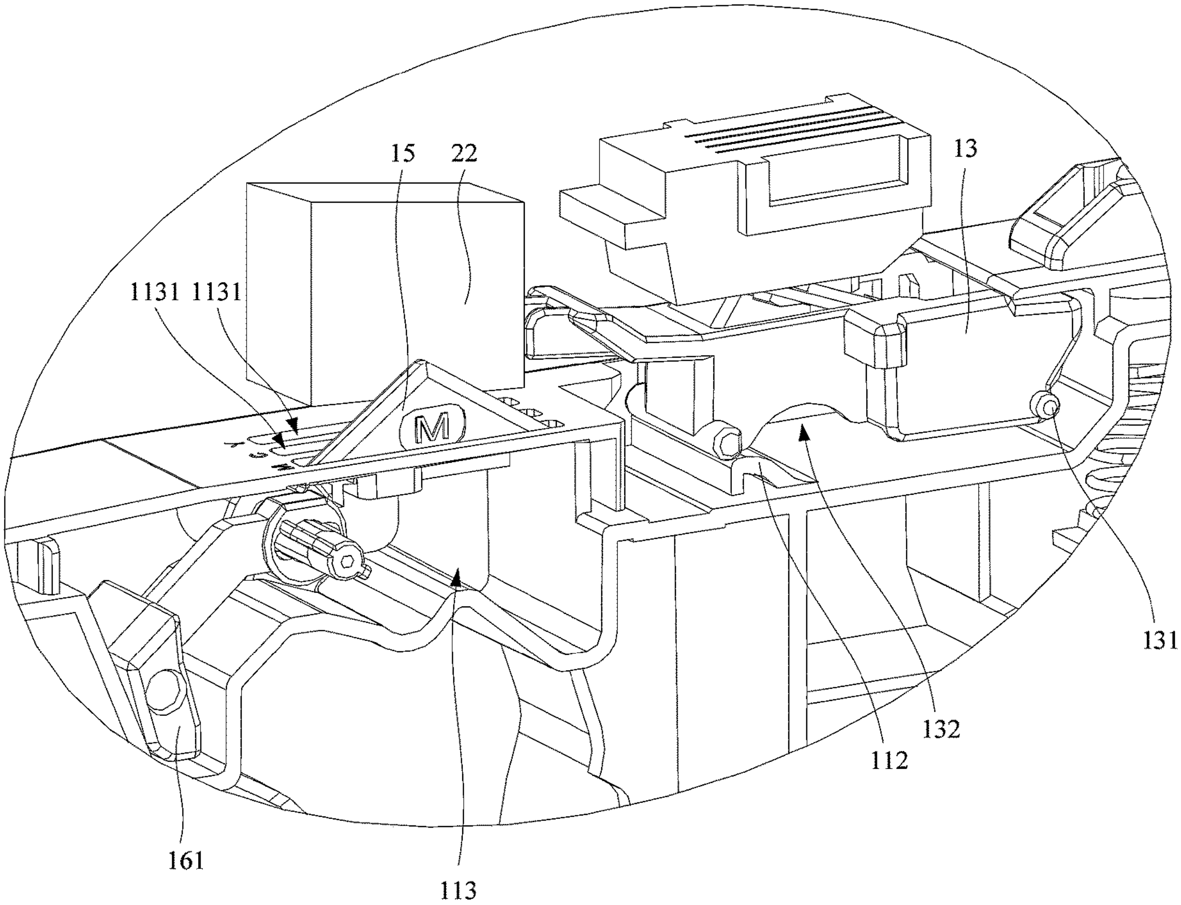
FIG. 14 is a structural schematic diagram of portion D in FIG. 13.
Figure 15:
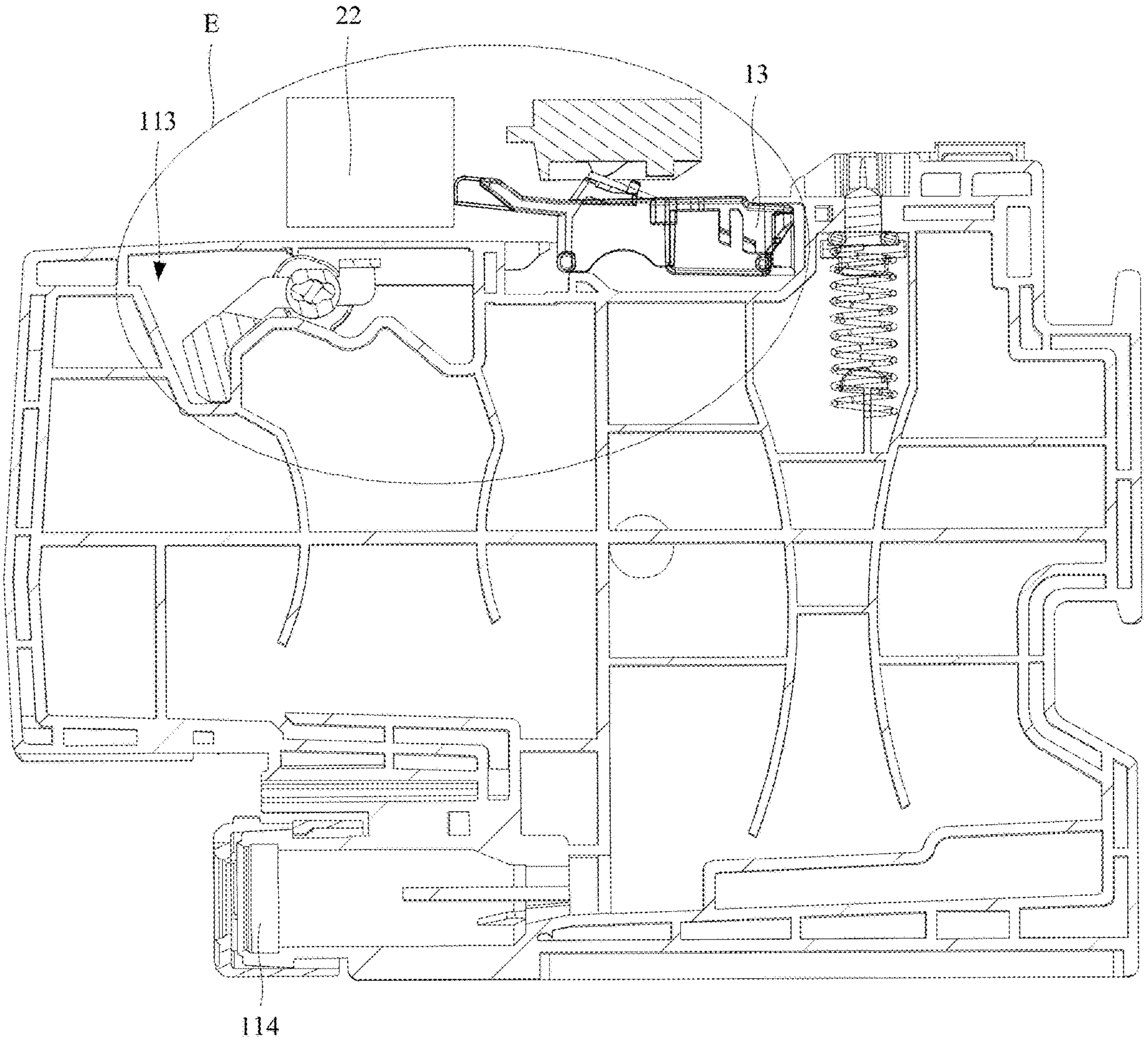
FIG. 15 is a side view of the ink cartridge in FIG. 13.
Figure 16:
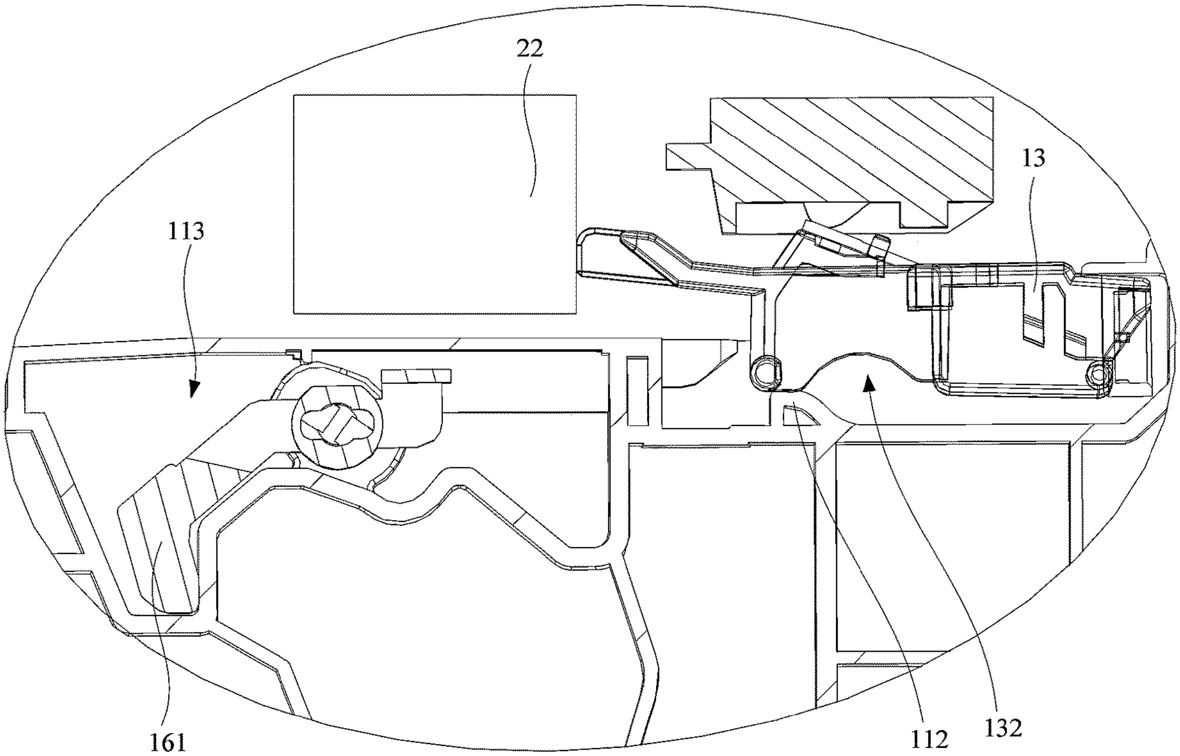
FIG. 16 is a structural schematic diagram of portion E in FIG. 15.
Figure 17:
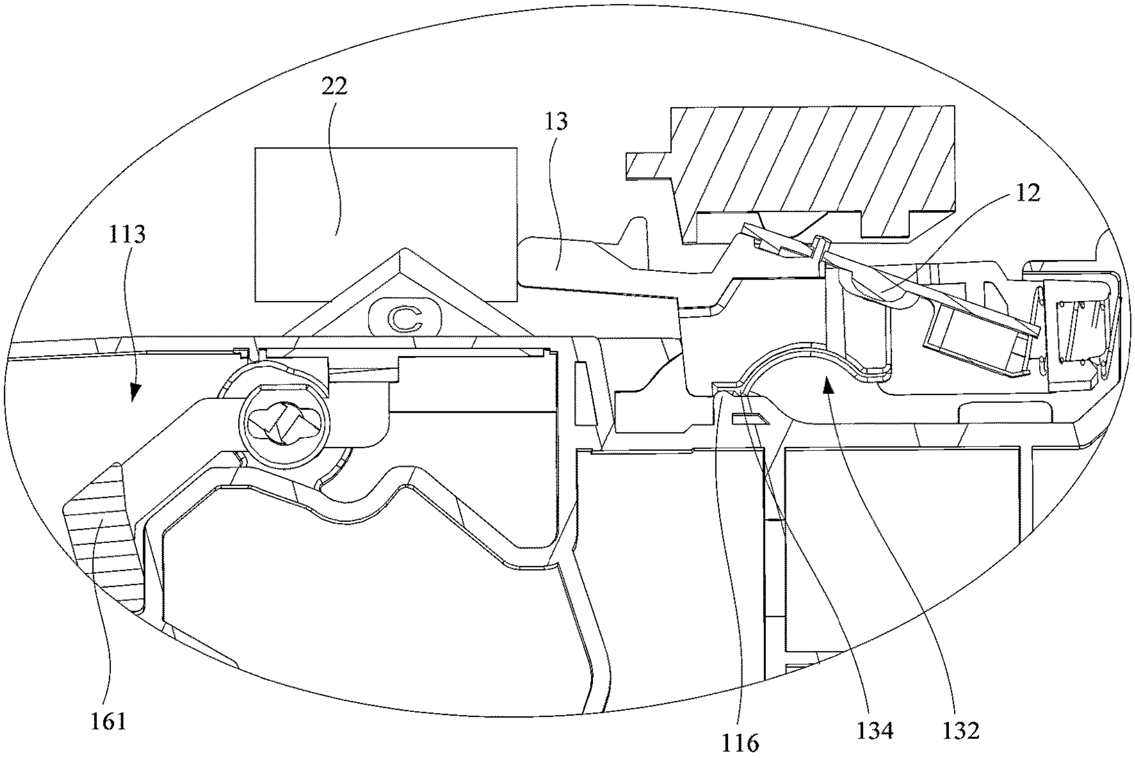
FIG. 17 is a structural schematic diagram of portion E in FIG. 12 when the stopping part is provided.
Figure 18:
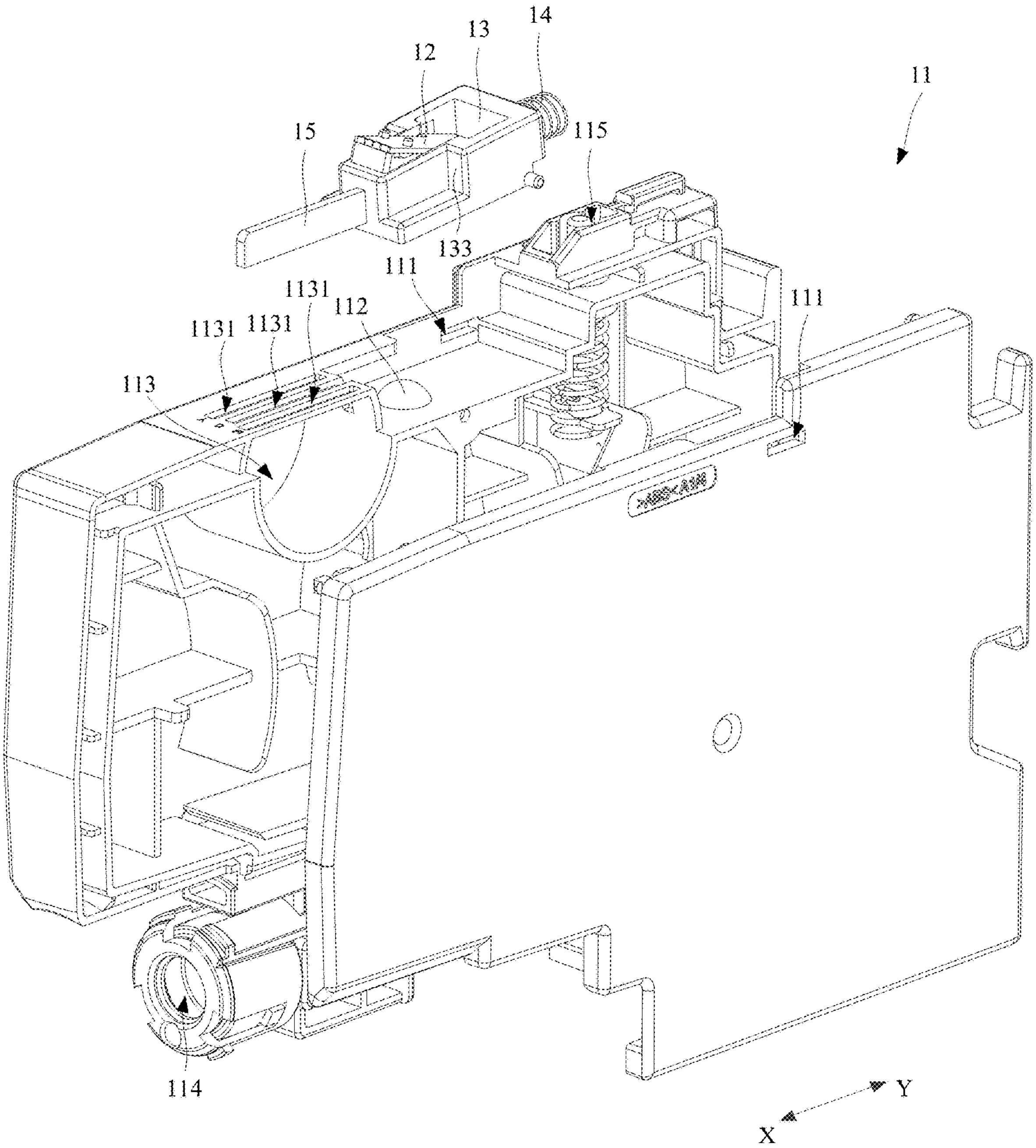
FIG. 18 is a structural schematic diagram of the ink cartridge in FIG. 1 when a light shielding part is connected to a chip holder.
Figure 19:
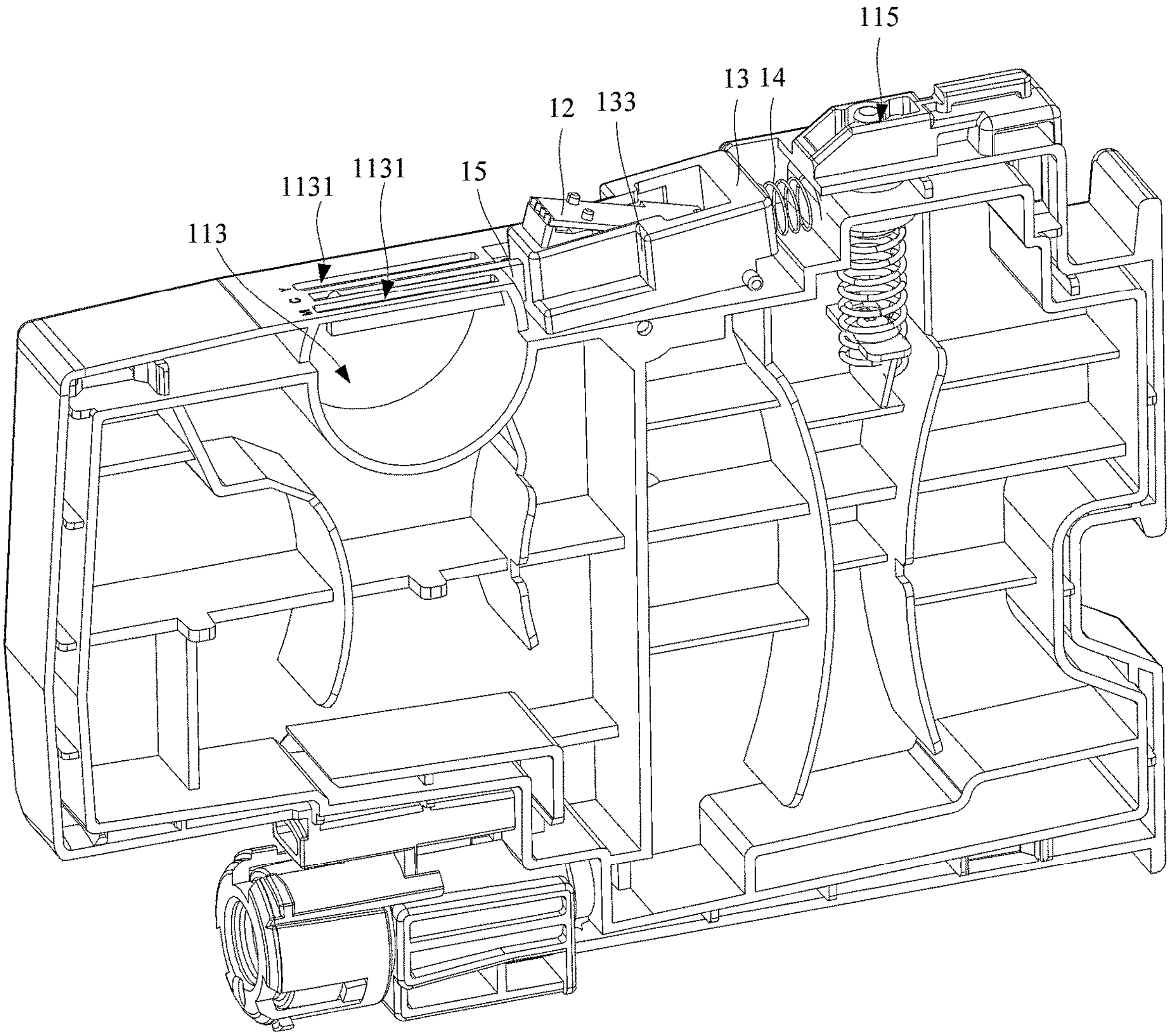
FIG. 19 is a structural schematic diagram of the ink cartridge in FIG. 18 when the stylus is separated from a chip.
Figure 20:
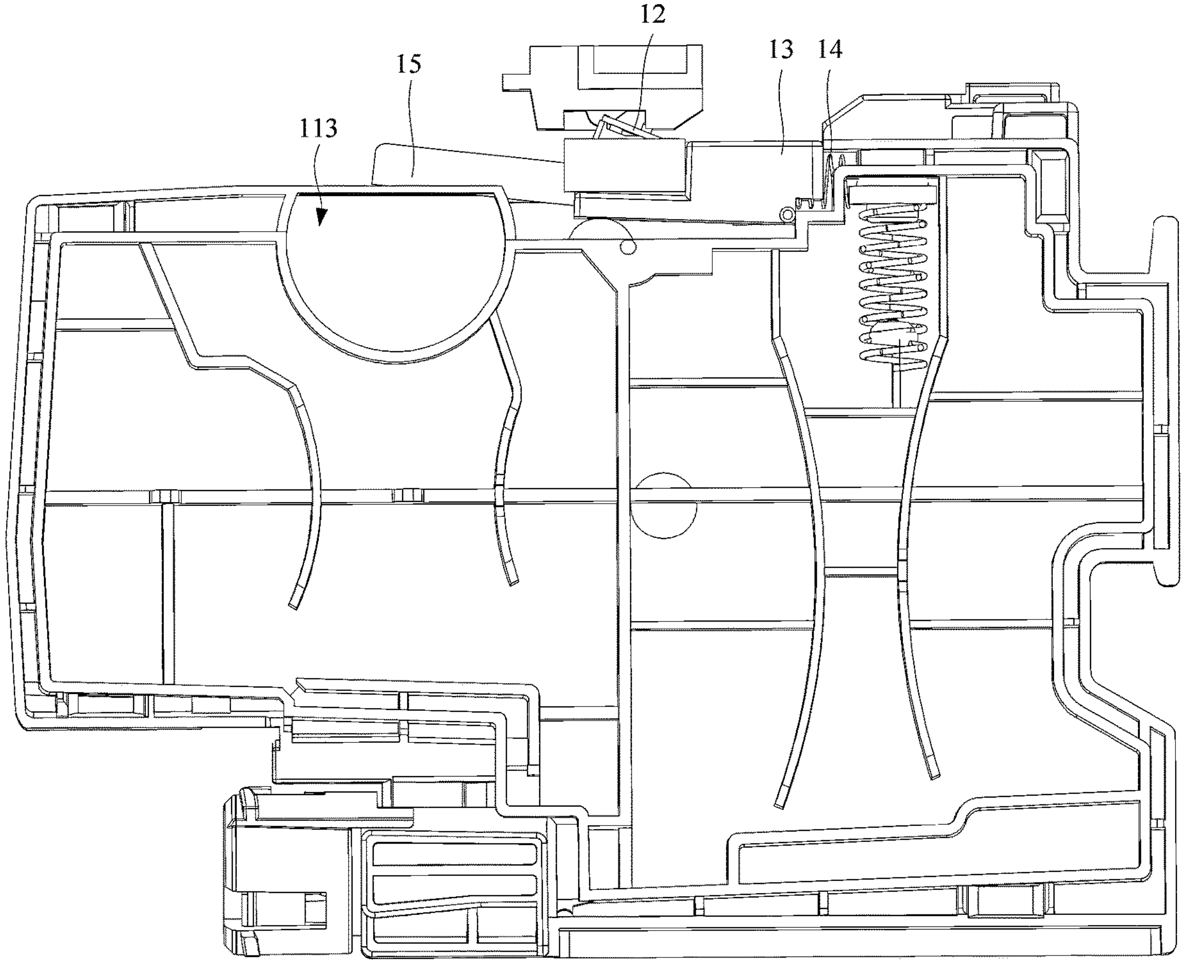
FIG. 20 is structural schematic diagram of the ink cartridge in FIG. 18 when the stylus is electrically connected to the chip.
Figure 21:
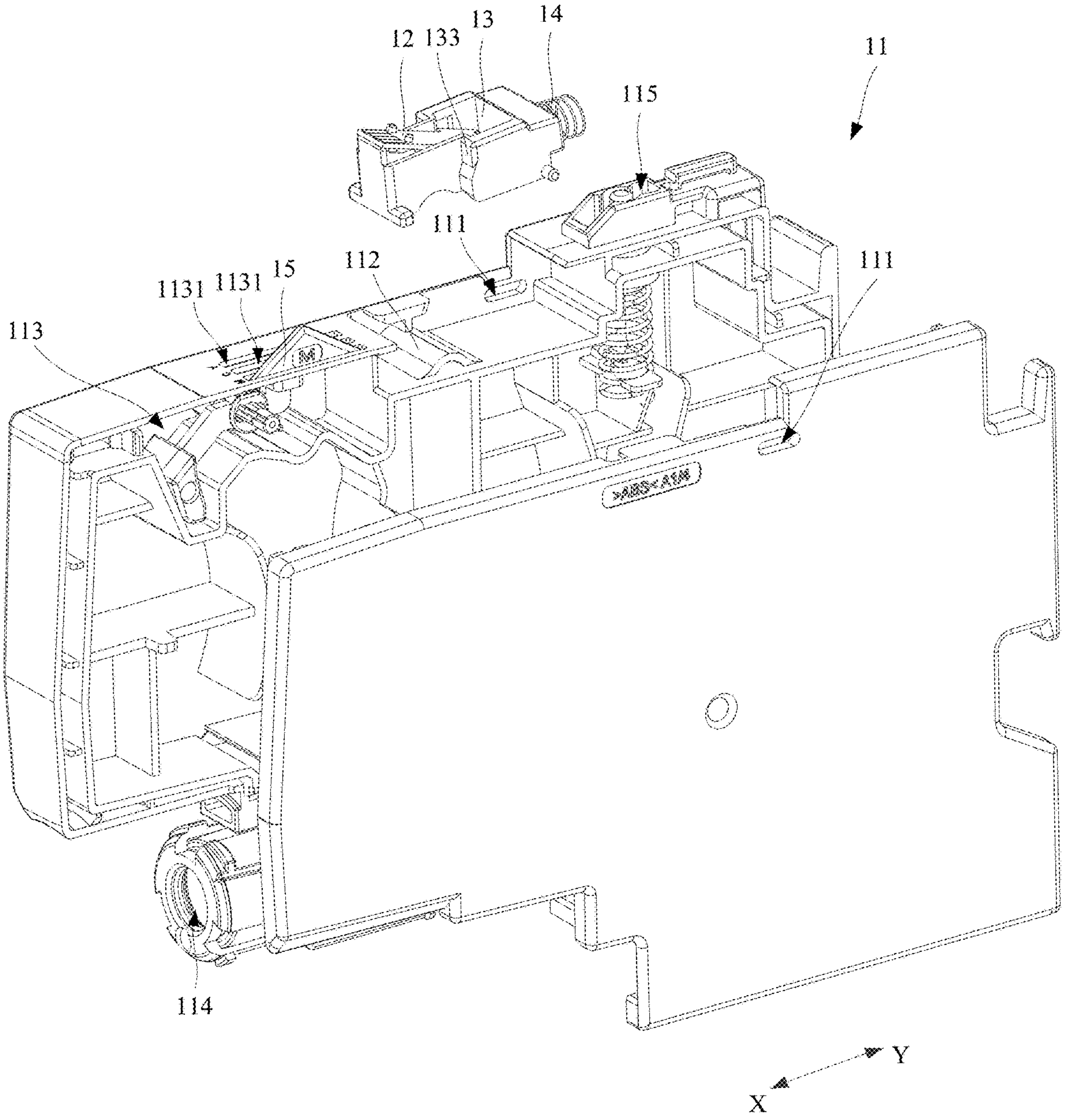
FIG. 21 is a structural schematic diagram of the ink cartridge in FIG. 1 when a printer abuts against both sides of the chip holder.

FIG. 1 is a structural schematic diagram of a printing apparatus provided in an embodiment of the present application. FIG. 2 is an exploded structural schematic diagram of an ink cartridge in FIG. 1. FIG. 3 is a structural schematic diagram of the ink cartridge in FIG. 1 when a stylus is separated from a chip. FIG. 4 is a structural schematic diagram of portion A in FIG. 3. FIG. 5 is a structural schematic diagram of portion A in FIG. 3 when a stopping part is provided. FIG. 6 is a partial exploded structural schematic diagram of portion A in FIG. 5. FIG. 7 is a structural schematic diagram of the stylus in FIG. 3. FIG. 8 is a side view of the ink cartridge in FIG. 3. FIG. 9 is a structural schematic diagram of portion B in FIG. 8. FIG. 10 is a structural schematic diagram of portion B in FIG. 8 when a stopping part is provided. FIG. 11 is a structural schematic diagram of the ink cartridge in FIG. 1 when the stylus is electrically connected to the chip. FIG. 12 is a structural schematic diagram of portion C in FIG. 11. FIG. 13 is a partial structural schematic diagram of the ink cartridge in FIG. 11. FIG. 14 is a structural schematic diagram of portion D in FIG. 13. FIG. 15 is a side view of the ink cartridge in FIG. 13. FIG. 16 is a structural schematic diagram of portion E in FIG. 15. FIG. 17 is a structural schematic diagram of portion E in FIG. 12 when a stopping part is provided. FIG. 18 is a structural schematic diagram of the ink cartridge in FIG. 1 when a light shielding part is connected to a chip holder. FIG. 19 is a structural schematic diagram of the ink cartridge in FIG. 18 when the stylus is separated from the chip. FIG. 20 is structural schematic diagram of the ink cartridge in FIG. 18 when the stylus is electrically connected to the chip. FIG. 21 is a structural schematic diagram of the ink cartridge in FIG. 1 when the printer abuts against both sides of the chip holder.

Referring to FIGS. 1 to 21, this embodiment provides an ink cartridge 10, which is applied to a printer 20. The printer 20 is provided with a stylus 210. The ink cartridge 10 includes an ink cartridge body 11, a chip 12, and a chip holder 13, and the chip 12 is fixed to the chip holder 13. When the ink cartridge 10 is installed on the printer 20 along an installation direction X, the printer 20 may drive the chip holder 13 to move linearly along a top surface of the ink cartridge body. The chip holder is located at a first position before linearly moving, and the chip fixed seat is located at a second position after linearly moving. The chip at the first position is closer to the top surface of the ink cartridge body than the chip at the second position; and when the chip holder is at the second position, the chip abuts against a stylus.

Specifically, the printer 20 may be an inkjet printer, where the ink cartridge 10 is connected to the printer 20 to provide ink for the printer 20.

The ink cartridge 10 includes an ink cartridge body 11. A container-like structure for containing ink (such as an ink bag) is provided inside the ink cartridge body 11; or a sealed cavity is formed directly inside the ink cartridge body. The container-like structure is provided with an ink outlet 114 which communicates with an ink supply component (not shown) of the printer 20, and a print head (not shown) of the printer 20 is connected to the ink supply part. In this way, the ink may be delivered to the print head through the ink outlet 114 and the ink supply part, so as to enable the printer 20 to print preset characters or images.

The ink cartridge body 11 is also provided with a gas port 115 for adjusting the internal pressure of the ink cartridge body 11, so that the ink is discharged through the ink outlet 114.

The ink cartridge body 11 is also provided with the chip 12 and the chip holder 13, and the chip 12 is clamped and fixed to the chip holder 13. The printer 20 is further provided with the stylus 210, the structure of which may be that known to those skilled in the art. For example, the stylus 210 may be an elastic member. The chip 12 is provided with an electrical connection portion. When the electrical connection portion abuts against the stylus 210, the chip 12 is electrically connected to the electrical stylus 210, and communication between the chip 12 and the printer 20 is possible.

The chip holder 13 is movably connected to the ink cartridge body 11. For example, the chip holder 13 is slidably or rotatably connected to the ink cartridge body 11. In this embodiment, the chip holder 13 may move linearly along the top surface of the ink cartridge body 11, so that the chip holder 13 protrudes out of the ink cartridge body 11, that is, driving the chip 12 to extend out of the ink cartridges body 11. At this time, the distance between the chip 12 and the ink cartridges body 11 is increased, and the distance between the chip 12 and the stylus 210 is decreased.

That is, before the chip holder 13 moves linearly relative to the ink cartridge body 11, the chip holder is located at a first position; after the chip holder 13 moves linearly relative to the ink cartridge body 11, the chip holder is located at a second position, and the chip at the second position is closer to the stylus than the chip at the first position, so as to realize the electrical connection between the chip and the stylus.

According to different structures of the top surface of the ink cartridge body 11, the linear movement modes of the chip holder 13 relative to the ink cartridge body 11 may be different. For example, when the place of the ink cartridge body 11 in contact with the chip holder 13 is a plane, the linear movement of the chip holder 13 relative to the ink cartridge body 11 is a translation along the plane.

The linear movement distance of the chip holder 13 may be set according to the position of the stylus 210 in the printer 20, which is not limited in this embodiment.

When the ink cartridge 10 is installed in the printer 20, the printer 20 drives the chip holder 13 to move linearly relative to the ink cartridge body 11, and the distance between one end of the chip holder 13 for fixing the chip 12 and the stylus 210 becomes smaller. That is, the distance between the chip 12 and the stylus 210 becomes smaller until an electrical connection portion of the chip 12 abuts against the stylus 210. The chip 12 is electrically connected to the stylus 210. At this time, the ink cartridge 10 is installed in the printer 20, and the ink cartridge 10 and the printer 20 are fixed relative to each other.

That is, at this time, the chip holder 13 is disposed between the ink cartridge body 11 and the printer 20, and the chip holder 13 is fixed through the assembly-mating between the ink cartridge body 11 and the printer 20. Since the connection between the ink cartridge body 11 and the printer 20 is relatively stable, the chip holder 13 may be firmly supported between the ink cartridge body 11 and the printer 20, that is, the electrical connection between the chip 12 and the stylus 210 is relatively stable, as long as the ink cartridge body 11 and the printer 20 do not move relative to each other, for example, the ink cartridge body 11 is detached from the printer 20.

In some optional embodiments, when the top surface of the ink cartridge body 11 is an uneven surface, the linear movement of the chip holder 13 relative to the ink cartridge body 11 may be a combination of translation and rotation, so that the chip may protrude toward one side of the stylus. Specifically, one of the chip holder 13 and the ink cartridge body 11 is provided with a sliding part 131, and the other one of the chip holder 13 and the ink cartridge body 11 is provided with a guiding part 111. The guiding part 111 extends along the moving direction Y of the chip holder 13, the sliding part 131 is inserted into the guiding part 111 and may move relative to the guiding part 111, and the chip holder 13 may also rotate relative to the ink cartridge body 11 around the extending direction of the sliding part 131.

The sliding part 131 may move relative to the guiding part 111 along the extending direction of the guiding part 111, thereby realizing the relative translation between the chip holder 13 and the ink cartridge body 11. In addition, the chip holder 13 may also rotate around an axis represented by the extending direction of the sliding part 131. In this way, one end of the chip holder 13 moves linearly toward the side close to the ink cartridge body 11, and the other end of the chip holder 13 on which the chip 12 is disposed moves linearly toward the side far away from the ink cartridge body 11, so as to reduce the distance between the chip 12 and the stylus 210.

According to the set position and orientation of the stylus 210, the moving direction Y of the chip holder 13 may be set at an included angle with the installation direction X of the ink cartridge 10. Optionally, the extending direction of the guiding part 111 is parallel to the installation direction X of the ink cartridge 10. When the ink cartridge 10 is installed on the printer 20, the chip holder 13 may move relative to the ink cartridge body 11 in a direction opposite to the installation direction X of the ink cartridge 10, and the structure is simple.

In addition, the extending direction of the sliding part 131 is perpendicular to the extending direction of the guiding part 111. In this way, when the chip holder 13 rotates around the extending direction of the sliding part 131, one end of the chip holder 13 rotates toward the side close to the ink cartridge body 11, and the other end of the chip holder 13 on which the chip 12 is disposed rotates toward the side away from the ink cartridge body 11, so as to reduce the distance between the chip 12 and the stylus 210.

The sliding part 131 may be disposed on the ink cartridge body 11, and the guiding part 111 may be disposed on the chip holder 13. Considering that the size of the chip holder 13 is relatively small, optionally, the sliding part 131 may also be disposed on the chip holder 13, and the guiding part 111 is disposed on the ink cartridge body 11, which is easy to process and mold.

The sliding part 131 and the guiding part 111 may have different structures. Exemplarily, the sliding part 131 is connected to the chip holder 13 in a hinged manner, and the guiding part 111 is a guiding protrusion or a guiding groove, etc., which is connected to the sliding part 131.

In some optional embodiments, the guiding part 111 is a guiding chute disposed in the ink cartridge body 11, and the sliding part 131 is a cylindrical structure disposed on the chip holder 13. The sliding part 131 is inserted into the guiding chute and may move relative to the guiding chute. At this time, the sliding part 131 is protruding out of the chip holder 13, and the guiding chute is disposed in the ink cartridge body 11, which is simple in structure and easy to mold.

The width of the guiding chute may be the same as the outer diameter of the cylindrical structure so as to form a limit against the sliding part 131 through the inner wall surface of the guiding chute, thereby preventing the sliding part 131 from jumping in the width direction of the guiding part 111, and enabling the chip holder 13 to have a higher stability of movement.

The chip holder 13 may be driven by the printer 20 to rotate relative to the ink cartridge body 11. For example, the printer 20 is provided with a top-against part, and when the chip holder 13 abuts against the end surface of the top-against part, the chip holder 13 may obtain a driving force in a direction away from the ink cartridge body 11, so as to drive the chip holder 13 to rotate.

In some optional embodiments, the ink cartridge body 11 is provided with a driving part 112 protruding out of the ink cartridge body 11, and the driving part 112 protrudes toward the stylus 210 and is located on a side of the chip holder 13 away from the stylus 210. The driving part 112 is disposed along the moving track of the chip holder 13, and the chip holder 13 may be in contact with the driving part 112, so that the chip fixed seat 13 rotates around the sliding part 131 while moving relative to the driving part 112 along the wall surface of the driving part 112, and the distance between the chip 12 and the ink cartridge body 11 is changed.

The driving part 112 protrudes out of the wall surface of the ink cartridge body 11, and the wall surface of the driving part 112 at least includes a smooth curved surface, so that when the chip holder 13 is in contact with the driving part 112 and moves relative to the driving part 112 along the wall surface of the driving part 112, the moving process of the chip holder 13 is more stable.

The driving part 112 may be a columnar protrusion or a spherical protrusion. When the driving part 112 is the columnar protrusion, the cross-sectional shape of the driving part 112 may be irregular curve, which is not limited in this embodiment.

The distribution length of the smooth curved surface along the extending direction of the guiding part 111 may be different depending on the length of the contact track between the chip holder 13 and the driving part 112. Exemplarily, in this embodiment, the smooth curved surface may cover the driving part 112 along the extending direction of the guiding part 111. At this time, the wall surface of the driving part 112 is smoothly connected to the ink cartridge body 11.

The driving part 112 is located at the end of the chip holder 13 on which the chip 12 is disposed, so that when the end of the chip holder 13 on which the chip 12 is disposed contacts with different positions of the driving part 112, the distance between the chip 12 and the ink cartridge body 11 is correspondingly increased or decreased, that is, the distance between the chip 12 and the stylus 210 is correspondingly increased or decreased. At this point, the chip holder 13 rotates around the sliding part 131 as an axis.

Exemplarily, when the chip holder 13 abuts against the top end of the driving part 112, the distance between the chip 12 and the ink cartridge body 11 is the largest, and the chip 12 is electrically connected to the stylus 210. At this point, one side surface of the chip holder 13 is pressed against the driving part 112, and the chip 12 on the chip holder 13 is pressed against the stylus 210, so that there is a firmer connection between the chip 12 and the stylus 210.

According to the relative moving direction Y of the chip holder 13 and the ink cartridge body 11, the driving part 112 may be disposed at different positions. For example, when the moving direction Y of the chip holder 13 is the same as the installation direction X, the driving part 112 may be disposed at a side of the chip fixed seat 13. During the movement of the chip holder 13 relative to the ink cartridge body 11, the chip holder 13 moves toward a side close to or away from the driving part 112.

When the moving direction Y of the chip holder 13 is opposite to the installation direction X of the ink cartridge 10, in some optional embodiments, the chip holder 13 is provided with an accommodating groove 132 for accommodating the driving part 112, and the contour of the accommodating groove 132 is matched with the contour of the driving part 112. Or, the extending length of the accommodating groove 132 along the moving direction Y of the chip holder 13 is greater than that of the driving part 112 along the moving direction Y of the chip holder 13.

That is, when the ink cartridge 10 is not installed on the printer 20, the driving part 112 is located in the accommodating groove 132 of the chip holder 13.

In the process of installing the ink cartridge 10 on the printer 20, the printer 20 drives the chip holder 13 to move, and the sliding part 131 moves towards a side away from the driving part 112. When the side surface of the chip holder 13 facing the ink cartridge body 11 contacts with the wall surface of the driving part 112, the distance between one end of the chip fixed seat 13 on which the chip 12 is disposed and the ink cartridge body 11 is increased, that is, the chip holder 13 rotates around the sliding part 131 while moving until the chip 12 is electrically connected to the stylus 210.

When the contour of the accommodating groove 132 is matched with the contour of the driving part 112, the chip holder 13 rotates around the sliding part 131 while moving along the guiding part 111. When the extending length of the accommodating groove 132 along the moving direction Y of the chip holder 13 is greater than the extending length of the driving part 112 along the moving direction Y of the chip holder 13, the fixing part of the chip 12 may firstly move relative to the ink cartridge body 11 along the guiding part 111, and then the side surface of the chip fixing seat 13 facing the ink cartridge body 11 contacts with the wall surface of the driving part 112. At this time, the chip holder 13 rotates around the sliding part 131 while moving along the guiding part 111, which is determined according to the moving stroke of the chip holder 13 along the guiding part 111.

Referring to FIG. 11 to FIG. 16, in some optional embodiments, the extending length of the guiding part 111 is the same as the moving stroke of the chip holder 13, so that the sliding part 131 abuts against the end of the guiding part 111 when the chip 12 is electrically connected to the stylus 210.

That is, when the ink cartridge 10 is installed on the printer 20, the sliding part 131 moves to and abuts against the end of the guiding part 111.

At this time, one side surface of the chip holder 13 facing the ink cartridge body 11 abuts against the driving part 112, and the other side surface of the chip holder 13 away from the ink cartridge body 11 is provided with the chip 12, which abuts against the stylus 210. Further, one end of the chip holder 13 along the installation direction X abuts against the printer 20, and the sliding part 131 of the chip holder 13 abuts against an end portion of the guiding part 111. In this way, through the assembly-fitting relationship between the ink cartridge body 11 and the printer 20, the chip holder 13 is firmly clamped between the ink cartridge body 11 and the printer 20, so that the connection between the chip 12 and the stylus 210 is more stable.

It will be appreciated that when the ink cartridge 10 is installed on the printer 20, the printer 20 may perform printing jobs. In order for the printer 20 to continuously perform printing jobs, the stylus 210 of the printer 20 need to be in stable electrical connection state with the chip 12.

Referring to FIG. 5, FIG. 6, FIG. 10 and FIG. 17, the ink cartridge body 11 in this embodiment is provided with a stopping part 116. When the chip holder 13 is located at the second position and the ink cartridge 10 is electrically connected to the printer 20, the chip holder 13 abuts against the stopping part 116. Where, the portion of the chip holder 13 abutting against the stopping part 116 is located at the side of the stopping part 116 facing the second position, so that the stopping part 116 is disposed on the moving path of the chip holder 13 from the second position to the first position, which may prevent the chip holder 13 from moving towards the side of first position. That is, the chip 12 and the stylus 210 are maintained in a stable electrical connection state.

The stopping part 116 may be a groove disposed on the top surface of the ink cartridge body 11. In this way, part of the structure of the chip holder 13 extends into the stopping part 116 and is clamped with the stopping part 116, so that the chip holder 13 may be clamped at the second position.

In some optional embodiments, the stopping part 116 protrudes from the outer surface of the ink cartridge body 11, and the outer wall face of the chip holder 13 may abut against the stopping part 116.

In this way, the stopping part 116 has a side facing the second position side and a side facing the first position side. An accommodating groove may be sandwiched between the side of the stopping part 116 facing the second position side and the top surface of the ink cartridge body 11, and the position of the chip holder 13 abutting against the stopping part 116 may be accommodated in the accommodating groove and abuts against the side of the stopping part 116 facing the second position side.

At this time, the position of the chip holder 13 abutting against the stopping part 116 may be a part of the outer wall surface of the chip holder 13, which is simple in structure and easy to mold.

In some optional embodiments, the side of the chip holder 13 facing the ink cartridge body 11 is provided with a protruding clamping part 134. When the chip holder 13 is located at the second position, the clamping part 134 abuts against the stopping part 116; and when the chip holder 13 is switched between the first position and the second position, the clamping part 134 may move along the wall surface of the stopping part 116 on both sides of the stopping part 116.

That is, the position of the chip holder 13 abutting against the stopping part 116 may also be the protruding clamping part 134, which protrudes toward the side of the ink cartridge body 11, so that the structure is simple and the clamping state is firmer.

The protruding height of the clamping part 134 may be the same as or different from the protruding height of the stopping part 116. In this embodiment, the protruding height of the clamping part 134 is the same as the protruding height of the stopping part 116, so that the outer wall surface of the chip holder 13 may abut against the top end of the stopping part 116, and the top surface of the ink cartridge body 11 may abut against the clamping part 134. The contact area between the ink cartridge body 11 and the chip holder 13 is larger, and the clamping stability is higher.

In this way, when the chip holder 13 is located at the second position, the clamping part 134 may be located at the side of the stopping part 116 facing the second position, and abuts against the stopping part 116. When the chip holder 13 moves toward the first position side, the chip holder 13 moves firstly along the top surface of the ink cartridge body 11. Accordingly, the clamping part 134 may move along the outer wall surface of the stopping part 116 to the side of the stopping part 116 facing the first position and further to a side away from the stopping part 116. That is, when the chip holder 13 is switched between the first position and the second position, the clamping part 134 may move along the wall surface of the stopping part 116 between the side of the stopping part 116 facing the first position and the side of the stopping part 116 facing the second position.

In some optional embodiments, when the ink cartridge body is provided with a protruding driving part, the stopping part is disposed on the outer wall surface of the driving part, and the driving part 112 is disposed on the moving track of the chip holder 13. The chip holder 13 may contact with the driving part 112 and the stopping part 116, so that the chip holder 13 rotates around the sliding part 131 while moving relative to the driving part 112 along the wall surfaces of the driving part 112 and of the stopping part 116, and the distance between the chip 12 and the ink cartridge body 11 is changed.

At this time, the stopping part 116 may be a groove formed on an outer wall surface of the driving part 112. At this time, the recessed depth of the groove is smaller than the protruding height of the driving part 112, so that when the chip holder 13 abuts against the groove, the chip 12 in the first position is closer to the top surface of the ink cartridge body 11 than in the second position.

This embodiment is illustrated by taking the stopping part 116 protruding from the outer wall surface of the driving part 112 as an example. It can be understood that the height of the stopping part 116 protruding from the top surface of the ink cartridge body 11 is greater than the height of the driving part 112 protruding from the top surface of the ink cartridge body 11. In this case, when the end of the clamping part 134 abuts against the end of the stopping part 116, there is the maximum spacing between the end of the chip holder 13 on which the chip 12 is disposed and the ink cartridge body 11. At this time, the stylus 210 is pressed by the chip 12. When the chip holder 13 moves to the second position, the end portion of the clamping part 134 moves into the accommodating groove formed between the stopping part 116 and the ink cartridge body 11, the side wall surface of the clamping part 134 abuts against the side wall surface of the stopping part 116 facing the second position side, and the spacing between the end of the chip holder 13 on which the chip 12 is disposed and the ink cartridge body 11 is reduced. Accordingly, the degree of compression between the stylus 210 and the chip 12 is reduced correspondingly.

The driving part 112 may be disposed at different positions according to the relative moving direction of the chip holder 13 relative to the ink cartridge body 11 when the ink cartridge 10 is installed on the printer 20. For example, when the moving direction of the chip holder 13 is the same as the installation direction X, the driving part 112 may be disposed at one side of the chip fixed seat 13. During the movement of the chip holder 13 relative to the ink cartridge body 11, the chip holder 13 moves toward a side close to or away from the driving part 112.

When the ink cartridge 10 is installed on the printer 20 and the moving direction of the chip holder 13 is opposite to the installation direction X of the ink cartridge 10, in some optional embodiments, the position of the chip holder 13 abutting against the stopping part 116 is located outside the accommodating groove 132.

That is, when the ink cartridge 10 is not installed on the printer 20, the driving part 112 and the stopping part 116 are located in the accommodating groove 132 of the chip holder 13.

In the process of installing the ink cartridge 10 in the printer 20, the printer 20 drives the chip holder 13 to move, and the sliding part 131 moves toward the side away from the driving part 112. When the side surface of the chip holder 13 facing the ink cartridge body 11 is in contact with the wall surface of the driving part 112, the distance between the end of the chip holder 13 on which the chip 12 is disposed and the ink cartridge body 11 is increased. That is, the chip fixed seat 13 rotates around the sliding part 131 while moving. Where, when the end of the clamping part 134 abuts against the end of the stopping part 116, this distance reaches a maximum value. The chip holder 13 continues to move toward the second position side until the clamping part 134 falls into the accommodating groove formed by the stopping part 116 and the ink cartridge body 11, and this distance is correspondingly reduced. At this time, the chip 12 is electrically connected to the stylus 210.

The accommodating groove 132 may have different contours. For example, the contour of the accommodating groove 132 may be matched with the contour of the driving part 112, and the chip holder 13 rotates around the sliding part 131 while moving along the guiding part 111. At this time, the stopping part 116 may protrude from the outer wall surface of the driving part 112, and the accommodating groove 132 is correspondingly provided with an area for accommodating the driving part 112. Alternatively, the stopping part 116 is a groove formed in the driving part 112, and at this time, and the inner wall surface of the accommodating groove 132 may close the opening of the groove.

Of course, the extending length of the accommodating groove 132 along the moving direction Y of the chip holder 13 is greater than the extending length of the driving part 112 along the moving direction Y of the chip holder 13, that is, the accommodating space of the accommodating groove 132 is greater than the volume of the driving part 112. The chip holder 13 may firstly move relative to the ink cartridge body 11 along the guiding part 111, and then the side surface of the chip holder 13 facing the ink cartridge body 11 contacts with the wall surface of the driving part 112. At this time, the chip holder 13 rotates around the sliding part 131 while moving along the guiding part 111, which is determined according to the moving stroke of the chip holder 13 along the guiding part 111.

In some optional embodiments, when the extending length of the guiding part 111 is identical with the moving stroke of the chip holder 13 and the chip 12 is electrically connected to the stylus 210, the sliding part 131 abuts against the end of the guiding part 111 and the chip holder 13 abuts against the stopping part 116.

That is, when the ink cartridge 10 is installed on the printer 20, the sliding part 131 moves to the end portion of the guiding part 111 and abuts against the end portion of the guiding part 111.

At this time, one side surface of the chip holder 13 facing the ink cartridge body 11 abuts against the driving part 112 and the stopping part 116, the other side surface of the chip holder 13 away from the ink cartridge body 11 is provided with the chip 12, the chip 12 abuts against the stylus 210, and the sliding part 131 of the chip holder 13 abuts against the end portion of the guiding part 111. In this way, through the assembly-fitting relationship between the ink cartridge body 11 and the printer 20, the chip holder 13 is firmly clamped between the ink cartridge body 11 and the printer 20, so that the connection between the chip 12 and the stylus 210 is more stable.

In some optional embodiments, an elastic restoring member 14 is disposed between the chip holder 13 and the ink cartridge body 11, and a direction of an elastic force of the elastic restoring member 14 is parallel to and opposite to the moving direction Y of the chip holder 13. When the ink cartridge 10 is separated from the printer 20, the chip holder 13 may move along the extending direction of the guiding part 111 under the elastic force of the elastic restoring member 14, so as to reduce the distance between the chip 12 and the ink cartridge body 11.

In this way, when the ink cartridge 10 is detached from the printer 20, for example, when the ink cartridge 10 is repaired, the chip holder 13 may move under the action of the elastic force of the elastic member, the side surface of the chip holder 13 facing the ink cartridge body 11 moves relative to the driving part 112, and the spacing between one end of the chip fixed seat 13 on which the chip 12 is disposed and the ink cartridge body 11 is reduced until the driving part 112 is accommodated in the accommodating groove 132. In this way, the spacing between the chip 12 and the ink cartridge body 11 is smaller, which may constitute protection for the chip 12 and reduce the probability of foreign objects hitting the chip 12.

The elastic restoring member 14 may be a spring, an elastic rubber block and so on.

Of course, the chip holder 13 is continuously subjected to the elastic force of the elastic restoring member 14. Since the top surface of the ink cartridge body 11 is provided with the stopping part 116, the chip holder 13 may abut against the stopping part 116 under the action of an elastic force, so as to prevent the chip 12 on chip holder 13 from separating from the stylus 210 due to the elastic force of the elastic restoring member 14.

Depending on the structure of the chip holder 13 and the structure of the printer 20, the printer 20 may abut against any position of the chip holder 13. Considering that the moving direction Y of the chip holder 13 is opposite to the installation direction X of the ink cartridge 10, optionally, the position of the chip holder 13 abutting against the printer 20 is located at the end portion of the chip holder 13 along its moving direction Y; and/or, the position of the chip holder 13 abutting against the printer 20 is located at both sides of the chip holder 13 along its moving direction Y.

Where, the position of the chip holder 13 abutting against the printer 20 may be a contact surface 133, so that the contact area between the chip holder 13 and the printer 20 is larger, and the contact between the chip holder and the printer 20 is more stable. The contact surface 133 may be an end surface of the chip holder 13 along the installation direction X (as shown in FIGS. 11 to 16). Of course, this contact surface 133 may also be disposed on either side or both sides of the chip holder 13 along the installation direction X (as shown in FIG. 18 to FIG. 21), which is not limited in this embodiment.

In some optional embodiments, the ink cartridge body 11 is further provided with a light shielding part 15, which is used for shielding the detection light of the printer 20 when the ink cartridge 10 is installed on the printer 20, so as to prompt that the ink cartridge 10 is installed in place.

That is, when the ink cartridge 10 is installed on the printer 20, the light shielding part 15 on the ink cartridge body 11 may block or reflect the detection light of the printer 20. After receiving a signal that the detection light is blocked or reflected, the control system of the printer 20 determines that the ink cartridge 10 is installed in place, that is, the ink container 10 is firmly connected to the printer 20.

The ink cartridge 10 may have different types. For example, different colors or different types of ink may be provided in the ink cartridge 10. In order to facilitate the printer 20 to identify and distinguish the types of the ink cartridges 10, in some optional embodiments, the light shielding part 15 may be provided at different positions of the ink cartridge body 11 along the light emitting direction of the detection light, so as to distinguish the type of the ink cartridge 10 by changing the light emitting distance of the detection light.

In this way, when the light shielding part 15 is disposed at different positions along the light emitting direction of the detection light, the distance between the component of the printer 20 emitting the detection light and the light shielding part 15 changes, that is, the light emitting distance of the detection light changes; and the control system of the printer 20 may identify the type of current ink cartridge 10 according to the light emitting distance of the detection light.

The light shielding part 15 may be fixedly connected to the ink cartridge body 11.

In some optional embodiments, the ink cartridge body is provided with an ink outlet; in the installation direction of the ink cartridge, the chip and the chip holder are farther away from the ink outlet relative to the light shielding part; and in the first position, the highest point of the chip is lower than the light shielding part in the direction of gravity; and in the second position, the highest point of the chip is higher than the light shielding part in the direction of gravity.

The relative positions of the ink outlet, the light shielding part and the chip holder on the ink cartridge body may be set as required, which is not limited in this embodiment.

When the light shielding part is fixed on the ink cartridge body, the light shielding part protrudes out of the outer wall surface of the ink cartridge body. Then, when the chip holder is located at the first position, the highest point of the chip is higher than the light shielding part in the direction of gravity, so that the light shielding part may form protection for the chip. For example, when a foreign object collides with the ink cartridge body, the foreign object may be stopped by colliding with the light shielding part, thereby preventing the chip from being impacted by the foreign object.

When the ink cartridge is installed on the printer, the chip extends towards the stylus side, and the extending distance of the chip in the direction of gravity may be set according to the assembly structure of the ink cartridge and the printer. For example, when the chip is electrically connected with the stylus, the highest point of the chip is higher than the light shielding part in the direction of gravity.

It should be noted that the light shielding part 15 may also be movably connected to the ink cartridge body 11. In some optional embodiments, a protective receiving groove 113 is disposed in the ink cartridge body 11, and the light shielding part 15 may be received in the protective receiving groove 113.

In this way, the light shielding part 15 may automatically move into the protective receiving groove 113 under the impact of an external force. At this time, the light shielding part 15 does not protrude from the outer wall surface of the ink cartridge body 11, thereby forming a protection for the light shielding part 15 and preventing the light shielding part 15 from being deformed or broken due to the impact of external force.

When the ink cartridge body 11 is provided with the protective receiving groove 113, in order to identify the type of the ink cartridge 10, in some optional embodiments, the protective receiving groove 113 has a plurality of entrances 1131 for allowing the light shielding part 15 to extend out of the protective receiving groove 113; the plurality of entrances 1131 are disposed at intervals along the light emitting direction of the detection light, and the light shielding part 15 may extend out through different entrances 1131 to distinguish the type of the ink cartridge 10 by changing the light emitting distance of the detection light.

At this time, the ink cartridge body 11 may be provided with a plurality of light shielding parts 15, which correspond to the entrances 1131, so that one of the light shielding parts 15 is selected to extend out of the protective receiving groove 113 through the entrance 1131 according to the type of the ink cartridge 10.

Of course, the ink cartridge body 11 may also be provided with one light shielding part 15, so that the light shielding part 15 is provided at a position corresponding to the entrance 1131 according to the type of the ink cartridge 10.

In this way, when the light shielding parts 15 extend out of the protective receiving groove 113 from the different entrances 1131, the distance between the component of the printer 20 emitting the detection light and the light shielding part 15 changes, that is, the light emitting distance of the detection light changes, and the control system of the printer 20 may identify the type of the current ink cartridge 10 according to the light emitting distance of the detection light.

When the light shielding part 15 is movably connected to the ink cartridge body 11, the light shielding part 15 may have different structures so as to be inserted into or extend out of the protective receiving groove 113. Exemplarily, the light shielding part 15 may be slidably connected to the ink cartridge body 11.

In some optional embodiments, the ink cartridge 10 includes a shading member 16 which is rotatably connected to the ink cartridge body 11 and includes a counterweight part 161 and a light shielding part 15. The counterweight part 161 and the light shielding part 15 are respectively disposed at both sides of a rotation axis of the shading member 161, and both the rotation axis of the shading member 16 and the counterweight part 161 are located in the protective receiving groove 113. The gravity of the counterweight part 161 is greater than that of the light shielding part 15, so that the light shielding part 15 extends out of the protective receiving groove 113; and the light shielding part 15 may rotate around the rotation axis of the shading member 16 to be accommodated in the protective receiving groove 113.

Thus, in the natural state, the counterweight part 161 is located on a lower side of the light shielding part 15 in the height direction, and the light shielding part 15 extends out of the protective receiving groove 113.

When the light shielding part 15 is collided or struck by an external object, the shading member 16 may rotate around its own rotation axis, and the light shielding part 15 rotates into the protective receiving groove 113. At this time, the counterweight part 161 rotates upward around the rotation axis of the shading member 16, and is still located in the protective receiving groove 113. That is, at this time, the whole shading member 16 is located in the protective receiving groove 113.

When the external object is separated from the light shielding part 15 or the ink cartridge body 11, the counterweight part 161 rotates around the rotation axis of the shading member 16 under the action of its own gravity. Correspondingly, the light shielding part 15 extends out of the protective receiving groove 113, which is simple in structure.

Referring to FIG. 18 to FIG. 20, in some optional embodiments, the light shielding part 15 is fixedly connected to the chip holder 13. When the chip holder 13 extends and the chip 12 is electrically connected to the stylus 210, the light shielding part 15 extends from the protective receiving groove 113.

At this time, when the chip holder 13 does not abut against the driving part 112, the light shielding part 15 may be received in the protective receiving groove 113.

When the printer 20 drives the chip holder 13 to move and the chip holder 13 abuts against the driving part 112, the spacing between the end of the chip fixed seat 13 on which the chip 12 is disposed and the ink cartridge body 11 becomes larger. At this time, the light shielding part 15 rotates with the chip fixed seat 13 and extends out of the protective receiving groove 113.

That is, in this embodiment, the light shielding part 15 is received in the protective receiving groove 113 in a natural state. When the ink cartridge 10 is fixedly connected to the printer 20, the light shielding part 15 extends out of the protective receiving groove 113 to shield the detection light of the printer 20.

At this time, the contact surface of the chip holder 13 abutting against the printer 20 is an end surface of the chip holder 13 along the installation direction X.

When the contact surface of the chip holder 13 abutting against the printer 20 is located on both sides of the chip holder 13 along the installation direction X, as shown in FIG. 21, at this time, the chip holder 13 and the light shielding part 15 are independent from each other, and the contact surface 133 may be located on either side or both sides of the chip holder 13 along the installation direction X. Correspondingly, the positions of the printer 20 abutting against the chip holder 13 are also located on both sides of the chip holder 13 along the installation direction X.

The embodiment also provides a printing apparatus, including a printer 20 and the above ink cartridge 10, where the ink cartridge 10 is at least one, and the printer 20 is provided with a stylus 210 corresponding to the ink cartridge 10; the printer 20 is further provided with an installation part 21 corresponding to the ink cartridge 10, and the ink cartridge 10 is fixed on the printer 20 through the installation part 21.

The printer 20 includes a print head (not shown) and an ink supply portion (not shown) provided between the print head and the cartridge body 11. A container-like structure for holding ink (such as an ink bag) is provided inside the ink cartridge body 11; or a sealed cavity is formed directly inside the ink cartridge body 11. The container-like structure is provided with an ink outlet port 114 which communicates with an ink supply component (not shown) of the printer 20. In this way, the ink may be delivered to the print head through the ink outlet 114 and the ink supply component, so that the printer 20 may print predetermined characters or images. The structure, working principle, and achievable technical effects of the ink cartridge 10 have been described in the above embodiments, and will not be described in detail in this embodiment.

The printer 20 further includes the stylus 210, which is electrically connected to the chip 12 to enable communication between the chip 12 and the printer 20. The structure of the printer 20 is not limited in this embodiment.

When the ink cartridge 10 is installed on the printer 20, the printer 20 drives the chip holder 13 to move while driving the chip holder 13 to rotate, so that the spacing between one end of the chip fixed seat 13 for fixing the chip 12 and the stylus 210 becomes smaller, that is, the spacing between the chip 12 and the stylus 210 becomes smaller until the electrical connection portion of the chip 12 abuts against the stylus 210. At this time, the ink cartridge 10 is installed on the printer 20, and the ink cartridge 10 and the printer 20 are relatively fixed.

That is, at this time, the chip holder 13 is disposed between the ink cartridge body 11 and the printer 20, and the chip holder 13 is fixed through the assembly fitting between the ink cartridge body 11 and the printer 20. Since the connection between the ink cartridge body 11 and the printer 20 is relatively stable, as long as the ink cartridge body 11 does not move relative to the printer 20, for example, the ink cartridge 10 is detached from the printer 20, the chip holder 13 may be firmly supported between the ink cartridge body

11 and the printer 20, that is, the electrical connection between the chip 12 and the stylus 210 is relatively stable.

In some optional embodiments, the installation part 21 is an installation groove formed in the printer 20, and is internally provided with a protruding top-butting part. When the ink cartridge is installed on the printer, the top-butting part abuts against the chip holder.

In this way, the ink cartridge 10 is fixedly connected to the printer 20 by being inserted into the installation groove. During the ink cartridge 10 is inserted into the installation groove, part of the structure of the inner wall surface of the installation groove, namely the top-butting part 22, may drive the chip holder 13 to move and rotate. Where, the process that the chip holder 13 is driven to move relative to the ink cartridge body 11 by the top-butting part 22 has been described in the above embodiment, and will not be repeated in this embodiment.

The top-butting part 22 may be a protruding structure of the inner wall surface of the installation groove, and the protruded structure may be a bump and any other structure, which is not limited in this embodiment.

The above mentioned is only a specific embodiment of the present application, but the scope of protection of the present application is not limited thereto, and any variations or substitutions that can be easily conceived by those skilled in the art within the technical scope disclosed in the present application shall be encompassed in the scope of protection of the present application. Therefore, the scope of protection of the present application shall be subject to the scope of protection of the claims.

What is claimed is:

1. An ink cartridge, which is applied to a printer provided with a stylus, the ink cartridge comprising: an ink cartridge body, a chip and a chip holder, and the chip is fixed on the chip holder;

when the ink cartridge is installed on the printer along an installation direction, the printer drives the chip holder to move linearly along a top surface of the ink cartridge body, and the chip holder is located at a first position before linearly moving and is located at a second position after linearly moving; and the chip at the first position is closer to the top surface of the ink cartridge body than the chip at the second position, and when the chip holder is at the second position, the chip abuts against the stylus.

2. The ink cartridge according to claim 1, wherein one of the chip holder and the ink cartridge body is provided with a sliding part; the other one of the chip holder and the ink cartridge body is provided with a guiding part; the guiding part extends along a moving direction of the chip holder; the sliding part is inserted into the guiding part and moves relative to the guiding part; and the chip holder also rotates relative to the ink cartridge body around an extending direction of the sliding part.

3. The ink cartridge according to claim 2, wherein the ink cartridge body is provided with a driving part protruding out of the ink cartridge body, and the driving part protrudes toward the stylus, and is located on one side of the chip holder away from the stylus; and the driving part is disposed on a moving track of the chip holder, and the chip holder is in contact with the driving part so as to rotate around the sliding part while moving relative to the driving part along a wall surface of the driving part and change a spacing between the chip and the ink cartridge body.

4. The ink cartridge according to claim 3, wherein the chip holder is provided with an accommodating groove for accommodating the driving part, and a contour of the accommodating groove is matched with a contour of the driving part; or an extending length of the accommodating groove along a moving direction of the chip holder is greater than that of the driving part along the moving direction of the chip holder.

5. The ink cartridge according to claim 2, wherein an extending length of the guiding part is identical with a moving stroke of the chip holder, to make the sliding part abut against an end portion of the guiding part when the chip is electrically connected to the stylus.

6. The ink cartridge according to claim 2, wherein the sliding part is disposed on the chip holder, and the guiding part is disposed on the ink cartridge body.

7. The ink cartridge according to claim 6, wherein the guiding part is a guiding chute disposed on the ink cartridge body, and the sliding part is a cylindrical structure disposed on the chip holder; and the sliding part is inserted into the guiding chute and moves relative to the guiding chute.

8. The ink cartridge according to claim 2, wherein an elastic restoring member is disposed between the chip holder and the ink cartridge body, and a direction of an elastic force of the elastic restoring member is parallel to and opposite to a moving direction of the chip holder; and when the ink cartridge is separated from the printer, the chip holder moves along an extending direction of the guiding part under an action of the elastic force of the elastic restoring part so as to reduce a spacing between the chip and the ink cartridge body.

9. The ink cartridge according to claim 2, wherein a position of the chip holder abutting against the printer is located at an end portion of the chip holder along its moving direction.

10. The ink cartridge according to claim 2, wherein a position of the chip holder abutting against the printer is located on both sides of the chip holder along its moving direction.

11. The ink cartridge according to claim 2, wherein an extending direction of the guiding part is parallel to an installation direction of the ink cartridge; and when the ink cartridge is installed on the printer, the chip holder moves relative to the ink cartridge body in a direction opposite to the installation direction of the ink cartridge.

12. The ink cartridge according to claim 1, wherein the ink cartridge body is provided with a stopping part, and when the chip holder is located at the second position, the chip holder abuts against the stopping part so as to prevent the chip holder from moving from the second position to the first position.

13. The ink cartridge according to claim 12, wherein the stopping part protrudes from an outer surface of the ink cartridge body, and an outer wall surface of the chip holder abuts against the stopping part.

14. The ink cartridge according to claim 13, wherein one side of the chip holder facing the ink cartridge body is provided with a protruding clamping part, and when the chip holder is located at the second position, the clamping part abuts against the stopping part; and when the chip holder is switched between the first position and the second position, the clamping part moves along a wall surface of the stopping part on both sides of the stopping part.

15. The ink cartridge according to claim 1, wherein the ink cartridge body is further provided with a light shielding part, and the light shielding part is configured for shielding a detection light of the printer when the ink cartridge is installed on the printer, so as to prompt that the ink cartridge is installed in place.

16. The ink cartridge according to claim 15, wherein the ink cartridge body has an ink outlet; in an installation direction of the ink cartridge, the chip and the chip holder are further away from the ink outlet relative to the shading part;

at the first position, the highest point of the chip is lower than the light shielding part in a direction of gravity; and at the second position, the highest point of the chip is higher than the light shielding part in the direction of gravity.

17. The ink cartridge according to claim 15, wherein the ink cartridge body is provided with a protective receiving groove, and the light shielding part is received in the protective receiving groove; and the light shielding part is fixedly connected with the chip holder, and when the chip holder extends out and the chip is electrically connected with the stylus, the light shielding part extends out of the protective receiving groove to shield the detection light.

18. The ink cartridge according to claim 16, wherein the ink cartridge body is provided with a protective receiving groove, and the light shielding part is received in the protective receiving groove; and the light shielding part is fixedly connected with the chip holder, and when the chip holder extends out and the chip is electrically connected with the stylus, the light shielding part extends out of the protective receiving groove to shield the detection light.

19. A printing apparatus, comprising a printer and the ink cartridge according to claim 1, wherein the ink cartridge is at least one, and the printer is provided with a stylus corresponding to the ink cartridge;

the printer is further provided with an installation part corresponding to the ink cartridge, and the ink cartridge is fixed on the printer through the installation part; and the installation part is internally provided with a protruding top-butting part, and when the ink cartridge is installed on the printer, the top-butting part abuts against the chip holder.

* * * * *